US012384160B2

(12) United States Patent
Yoshikawa et al.

(10) Patent No.: US 12,384,160 B2
(45) Date of Patent: Aug. 12, 2025

(54) LIQUID EJECTION HEAD AND LIQUID EJECTION APPARATUS

(71) Applicant: CANON KABUSHIKI KAISHA, Tokyo (JP)

(72) Inventors: Shimpei Yoshikawa, Kanagawa (JP); Takeho Miyashita, Kanagawa (JP); Kyosuke Toda, Kanagawa (JP); Chiaki Muraoka, Saitama (JP)

(73) Assignee: Canon Kabushiki Kaisha, Tokyo (JP)

(*) Notice: Subject to any disclaimer, the term of this patent is extended or adjusted under 35 U.S.C. 154(b) by 280 days.

(21) Appl. No.: 18/319,252

(22) Filed: May 17, 2023

(65) Prior Publication Data

US 2023/0373218 A1 Nov. 23, 2023

(30) Foreign Application Priority Data

May 19, 2022 (JP) ................................ 2022-082209

(51) Int. Cl.
*B41J 2/175* (2006.01)

(52) U.S. Cl.
CPC .................................... *B41J 2/175* (2013.01)

(58) Field of Classification Search
CPC ................................... B41J 2/18; B41J 2/175
See application file for complete search history.

(56) References Cited

U.S. PATENT DOCUMENTS 8,517,518 B2 * 8/2013 Kashu .................... B41J 2/1433 347/89
10,421,287 B2 * 9/2019 Yamazaki .................. B41J 2/18
11,040,536 B2 * 6/2021 Yoneta .................... B41J 2/1433
11,981,142 B2 * 5/2024 Tamaru ................ B41J 2/14072

FOREIGN PATENT DOCUMENTS

JP 2011-098491 A 5/2011

* cited by examiner

*Primary Examiner* — An H Do
(74) *Attorney, Agent, or Firm* — Canon U.S.A., Inc. IP Division

(57) ABSTRACT

A liquid ejection head includes an ejection unit, a channel member, and a circulation unit. The ejection unit includes an ejection port array in which ejection ports configured to eject a liquid are arrayed, and a communication channel communicating with the ejection port array. The channel member includes a channel that supplies and collects the liquid to and from the communication channel. The circulation unit supplies the liquid to the channel of the channel member and collects the liquid from the channel of the channel member. The ejection unit further includes a plurality of ejection port arrays that eject a liquid of the same type, and a plurality of communication channels corresponding to the plurality of ejection port arrays. The channel member includes a plurality of individual channels respectively through which the plurality of communication channels communicate with one of the circulation unit as a single circulation unit.

24 Claims, 16 Drawing Sheets

FIG.9A
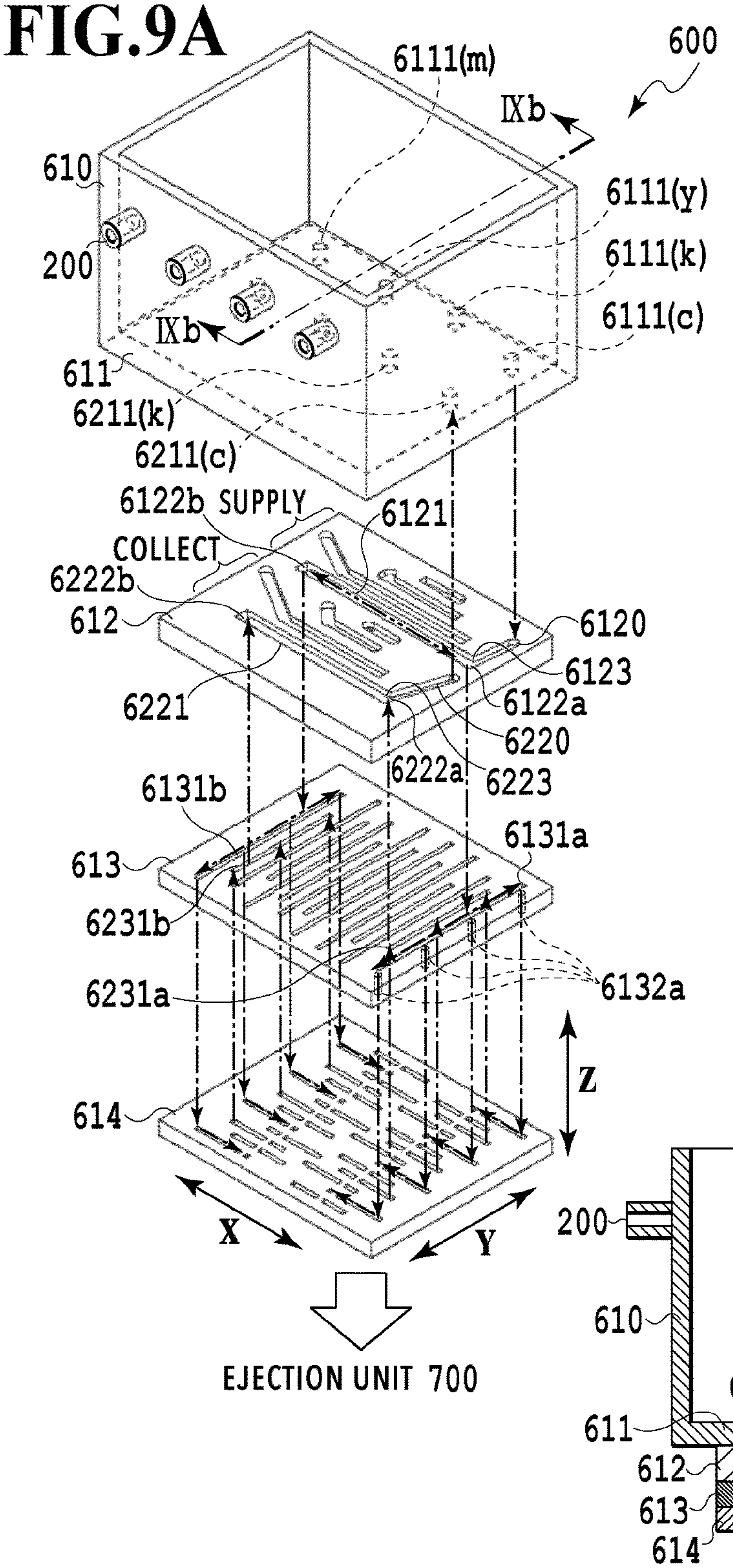
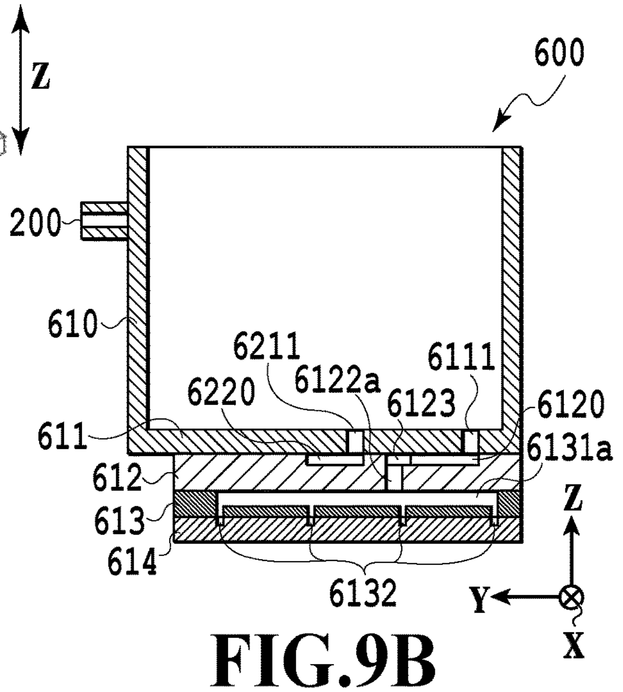
FIG.9B

LIQUID EJECTION HEAD AND LIQUID EJECTION APPARATUS

BACKGROUND

Field

The present disclosure relates to a liquid ejection head configured to perform printing while circulating a liquid, and a liquid ejection apparatus comprising the liquid ejection head.

Description of the Related Art

In a liquid ejection apparatus such as an inkjet printing apparatus, since retention of bubbles mixed in a liquid in the liquid ejection head and thickening of the liquid near the ejection port can be factors for decrease in the ejection performance of the liquid ejection head, measures against these are required.

Japanese Patent Laid-Open No. 2011-098491 discloses a technique which circulates a liquid in a liquid ejection head for the purpose of discharging bubbles in the liquid and suppressing the thickening of the liquid near the ejection port.

In addition, in a liquid ejection apparatus, bidirectional printing in which the liquid is ejected in both the forward scanning and the backward scanning of the liquid ejection head is performed in order to improve the printing speed. In a liquid ejection apparatus which performs bidirectional printing, in a case where a liquid ejection head in which ejection port arrays are arranged one for each of the colors of liquids to be ejected, the order of liquids of two colors is different between the forward scanning and the backward scanning, which can cause color unevenness in a formed image. For this reason, a bidirectional head in which two ejection port array groups in each of which ejection port arrays of a plurality of colors are arrayed are line-symmetrically arranged is used.

It has been considered to introduce a liquid circulation system into a liquid ejection head of a liquid ejection apparatus which performs such bidirectional printing.

SUMMARY

According to an aspect of the present disclosure, a liquid ejection head includes an ejection unit including an ejection port array in which ejection ports configured to eject a liquid are arrayed, and a communication channel communicating with the ejection port array, a channel member including a channel configured to supply and collect the liquid to and from the communication channel, and a circulation unit configured to supply the liquid to the channel of the channel member and collect the liquid from the channel of the channel member, wherein the ejection unit further includes a plurality of ejection port arrays configured to eject a liquid of the same type, and a plurality of communication channels corresponding to the plurality of ejection port arrays, and wherein the channel member includes a plurality of individual channels respectively through which the plurality of communication channels communicate with one of the circulation unit as a single circulation unit.

Further features of the present disclosure will become apparent from the following description of exemplary embodiments with reference to the attached drawings.

BRIEF DESCRIPTION OF THE DRAWINGS

FIGS. 9A and 9B are exploded perspective views showing an entire configuration of a channel member and a sectional view of the channel member;

DESCRIPTION OF THE EMBODIMENTS

However, in a liquid ejection head configured to perform bidirectional printing, an ejection port array configured to eject a liquid of the same color is arranged in each of the two ejection port array groups. For this reason, in a case of introducing a liquid circulation system, two liquid supply paths are required for ejection port arrays of the same colors. Then, there is an issue that in a case where circulation sources are provided for the respective liquid supply paths, the size of the liquid ejection head is increased.

The disclosed information relates to a liquid ejection head capable of achieving liquid circulation to a plurality of ejection port arrays which eject a liquid of the same color with a small-size configuration.

Hereinafter, preferred embodiments of the present disclosure will be described in detail with reference to the drawings. Note that the embodiments described below are not intended to limit the present disclosed matters, and all of the combinations of features described in the present embodiments do not have to be necessary. Note that the same constituent elements are denoted by the same reference signs. In the present embodiment, as an ejection element to eject a liquid, an example employing a thermal system which ejects a liquid by generating bubbles using an electrothermal converting element will be described, but the present disclosure is not limited to this. The present embodiments can be applied to liquid ejection heads employing an ejection system which ejects a liquid by using piezoelectric elements, or other ejection systems. Moreover, the pressure adjustment unit and the like described below are not limited to the configurations described in embodiments and drawing themselves.

First Embodiment

<Liquid Ejection Apparatus>

Figure 1A:
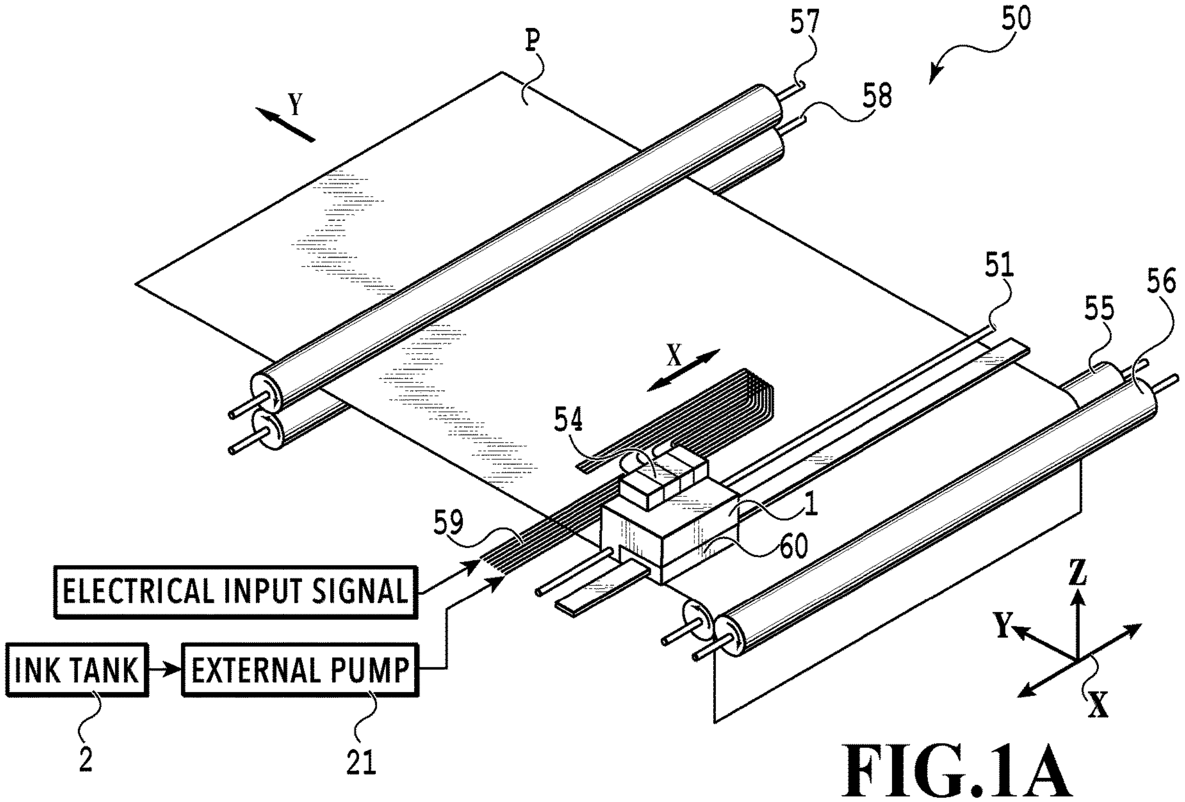
FIGS. 1A and 1B are diagrams for explaining a liquid ejection apparatus.

FIG. 1A is a perspective view schematically showing a liquid ejection apparatus using a liquid ejection head 1. The liquid ejection apparatus 50 of the present embodiment is configured as a serial-type inkjet printing apparatus configured to perform printing on a printing medium P by ejecting inks as liquids while scanning the liquid ejection head 1.

The liquid ejection head 1 is mounted on a carriage 60. The carriage 60 reciprocates along a guide shaft 51 in a main scanning direction (X direction). The printing medium P is conveyed by conveyance rollers 55, 56, 57, 58 which form a conveyance unit in a conveyance direction (sub scanning direction (Y direction)) which intersects (orthogonally intersects in the present example) the main scanning direction. Note that in the drawings to refer to below, the Z direction indicates the vertical direction, and intersects (orthogonally intersects in the present example) an X-Y plane which is defined by the X direction and the Y direction. The liquid ejection head 1 is configured to be detachable from and attachable to the carriage 60 by the user.

The liquid ejection head 1 includes a circulation unit 54 as a circulation source and an ejection unit 700 (see FIG. 2) which will be described later. Although the specific configuration will be described later, the ejection unit 700 is provided with a plurality of ejection ports and an energy generation element (hereinafter referred to as an ejection element) configured to generate ejection energy for ejecting a liquid from each ejection port.

In addition, the liquid ejection apparatus 50 is provided with ink tanks 2 which are ink supply sources and external pumps 21, and inks stored in the ink tanks 2 are supplied to the circulation units 54 via ink supply tubes 59 by drive forces of the external pumps 21.

The liquid ejection apparatus 50 forms a predetermined image on a printing medium P by causing the liquid ejection head 1 mounted on the carriage 60 to repeat a printing scan to eject the inks while moving in the main scanning direction to perform printing and a conveyance operation to convey the printing medium P in the sub scanning direction. Note that the liquid ejection head 1 in the present embodiment is capable of ejecting four types of inks, that is, black (k), cyan (c), magenta (m), and yellow (y), and is capable of printing a full-color image with these inks. However, the inks which can be ejected from the liquid ejection head 1 are not limited to the above four types of inks. The present disclosure can be applied to liquid ejection heads configured to eject other types of inks. In other words, the types and the number of inks to be ejected from the liquid ejection head are not limited.

In addition, the liquid ejection apparatus 50 is provided with a cap member (not shown) which can cover an ejection port face in which the ejection ports are formed in the liquid ejection head at a position away from a conveyance path for the printing medium P in the X direction. The cap member covers the ejection port face of the liquid ejection head 1 at the time of non-printing operation, and is used for drying prevention and protection of the ejection ports, and for ink suction operation from the ejection ports, and the like.

Note that the liquid ejection head 1 shown in FIG. 1A represents an example in which the liquid ejection head 1 includes four circulation units 54 corresponding to the four types of inks, but only has to include the circulation units 54 corresponding to the types of liquids to be ejected. In addition, the liquid ejection head 1 may include a plurality of circulation units 54 for a liquid of the same type. In other words, the liquid ejection head 1 may be configured to include one or more circulation units. The liquid ejection head 1 may be configured such that not all the four types of inks are circulated, but at least an ink of one type is circulated.

Figure 1B:
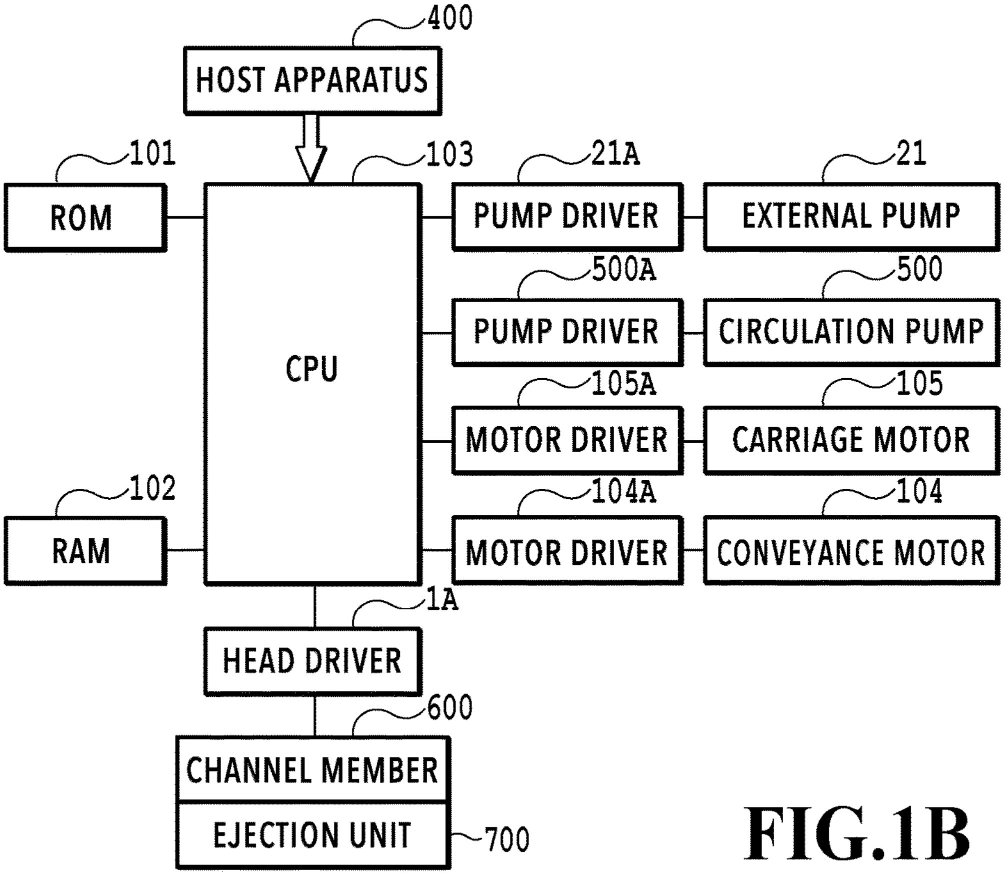

FIG. 1B is a block diagram showing a control system of the liquid ejection apparatus 50. A CPU 103 functions as a control unit configured to control operations of the respective units of the liquid ejection apparatus 50 based on programs of processing procedures and the like stored in a ROM 101. ARAM 102 is used as a work area and the like in the case where the CPU 103 executes the processing. The CPU 103 receives image data from a host apparatus 400 outside the liquid ejection apparatus 50, and controls a head driver 1A to control the drive of ejection elements provided in an ejection unit 700. In addition, the CPU 103 also controls drivers of various actuators provided in the liquid ejection apparatus 50. For example, the CPU 103 controls a motor driver 105A of a carriage motor 105 configured to move the carriage 60, a motor driver 104A of a conveyance motor 104 configured to convey the printing medium P, and the like. Moreover, the CPU 103 controls a pump driver 500A configured to drive a circulation pump 500, which will be described later, a pump driver 21A of an external pump 21, and the like. Note that although FIG. 1B shows a configuration of performing processing upon receipt of image data from the host apparatus 400, the processing may be performed in the liquid ejection apparatus 50 irrespective of data from the host apparatus 400.

<Liquid Ejection Head>

Figure 2:
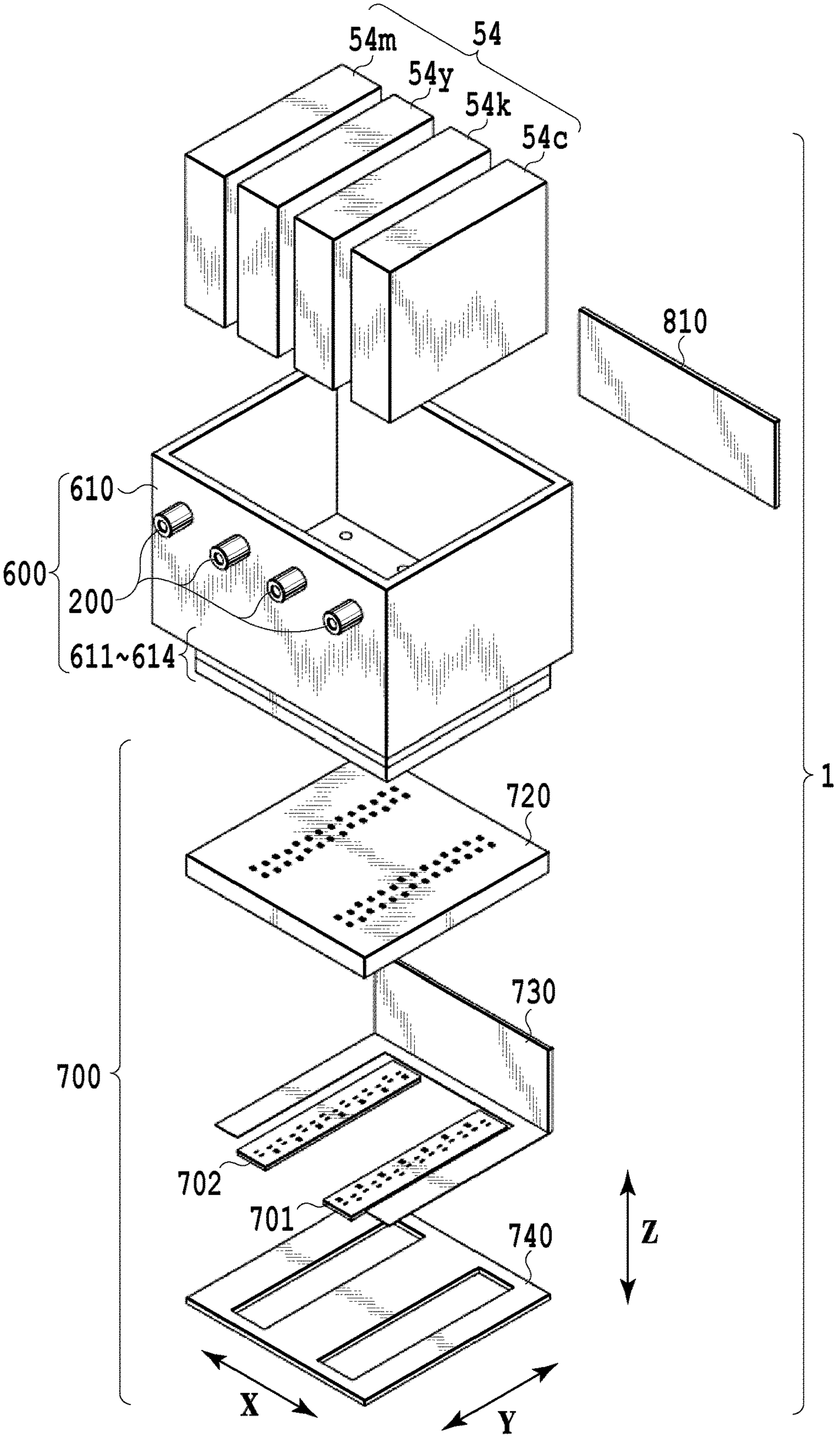
FIG. 2 is an exploded perspective view of a liquid ejection head.

FIG. 2 is an exploded perspective view showing a configuration of the liquid ejection head 1 of the present embodiment. The liquid ejection head 1 in the present embodiment is fixedly supported on the carriage 60 by a positioning unit and an electrical contact, which are not shown, provided in the carriage 60 of the liquid ejection apparatus 50. The liquid ejection head 1 ejects the inks while moving together with the carriage 60 in the main scanning direction (X direction) shown in FIG. 1 to perform printing on the printing medium P.

As shown in FIG. 2, the liquid ejection head 1 includes a channel member 600, the circulation units 54 as circulation sources, and an ejection unit 700 configured to eject the inks supplied from the circulation units 54 through the channel member 600 onto the printing medium P.

The channel member 600 includes a box-shaped housing unit 610 configured to house the circulation units 54, and channel substrates 611 to 614 of four layers provided on the bottom portion of the housing unit 610 (see FIG. 9). The detail of these channel substrates 611 to 614 will be described later. On one side face of the channel member 600, four joints 200 configured to be connected respectively to the four ink supply tubes 59 (FIG. 1A) corresponding to the four types of inks are provided.

The circulation units 54 include circulation units 54*m*, 54*y*, 54*k*, 54*c* corresponding respectively to a plurality of types (here, four types of black (k), cyan (c), magenta (m), and yellow (y)) of inks. These circulation units 54*m*, 54*y*, 54*k*, 54*c* are set in the housing unit 610 of the channel member 600. In the state where the circulation units 54 are set in the channel member 600, connection ports, which are not shown, formed in the side face portions of the respective circulation units 54 are connected to the four joints 200 of the channel member 600 such that the liquids can be communicated in between. In addition, in the bottom portion of each circulation unit 54, a liquid supply port and a liquid collection port, which are not shown, are formed. These liquid supply port and liquid collection port are connected to a supply-side first connection channel 6111 and a collection-side first connection channel 6211 (see FIG. 9), which are formed in a first channel substrate 611 (see FIG. 9) forming the bottom portion of the housing unit 610 of the channel member 600. The method for connecting the circulation units 54 and the channel member 600 only has to be a connection method that does not allow the liquids to leak at the connection portion. For example, the circulation units 54 and the channel member 600 may be connected by screwing with a seal member interposed in between, or may be connected by welding.

In this way, the circulation units 54 are connected to the respective ink supply tubes 59 via the joints 200 such that the liquids can be communicated in between, and are connected to the first channel substrate 611 via the liquid supply ports and the liquid collection ports. Hence, the inks supplied from the ink supply tubes 59 are supplied to the respective circulation units 54*a* to 54*d* through the joints 200 of the channel member 600. Moreover, to the channel member 600, the ejection unit 700 is connected, so that the inks supplied to the circulation units 54 are supplied to the ejection unit 700 through the channel member 600.

As shown in FIG. 2, the ejection unit 700 includes two ejection element substrates 701, 702, a supporting member 720, an electrical wiring board 730 configured to send electrical signals to the respective ejection element substrates 701, 702, a cover member 740 covering the electrical wiring board 730, and the like. In each ejection element substrate 701, 702, a plurality of ejection port arrays in each of which a plurality of ejection elements configured to generate ejection energy are arrayed in the Y direction are arranged in the X direction. In the present embodiment, in each ejection element substrate 701, 702, ejection port arrays corresponding respectively to the four types (four colors) of inks are arranged. Note that the detail of the ejection unit 700 will be described later.

The two ejection element substrates 701, 702 and the electrical wiring board 730 are fixed by adhesion to the supporting member 720. Moreover, the cover member 740 is joined by adhesion to the supporting member 720 in such a manner as to cover one face (a lower face in FIG. 2). The ejection element substrates 701, 702 and the electrical wiring board 730 are electrically connected by wire bonding. Note that the ejection element substrates 701, 702 and the electrical wiring board 730 can be electrically connected by flying lead bonding. In the cover member 740, openings are formed at portions corresponding to the ejection element substrates 701, 702, and ejection port faces in which the ejection ports of the ejection element substrates 701, 702 are formed are exposed through the openings. Note that the ejection unit 700 having the above-described configuration and the channel member 600 may be connected by adhesion using an adhesive or may be fixed to each other by screwing with a seal member interposed in between.

On the face opposite to the face on which the joints 200 are provided in the channel member 600, an electrical board 810 is fixed. The method for fixing the electrical board 810 may be fixation using rivets or an adhesive, or may be fixation using a double-sided tape. The electrical board 810 is electrically connected to the electrical wiring board 730. The electrical board 810 and the electrical wiring board 730 are electrically connected by using ACF bonding. However, this electrical connection may be made by using wire bonding or flying lead bonding. In addition, the electrical board 810 is electrically connected to the electrical connection portion of the carriage 60 in the state where the liquid ejection head 1 is mounted on the carriage 60, and receives electrical signals from the main body of the liquid ejection apparatus. The electrical signals received by the electrical board 810 are transmitted to the ejection element substrates 701, 702 via the electrical wiring board 730 of the ejection unit 700.

<Constituent Elements of Circulation Unit>

Figure 3:
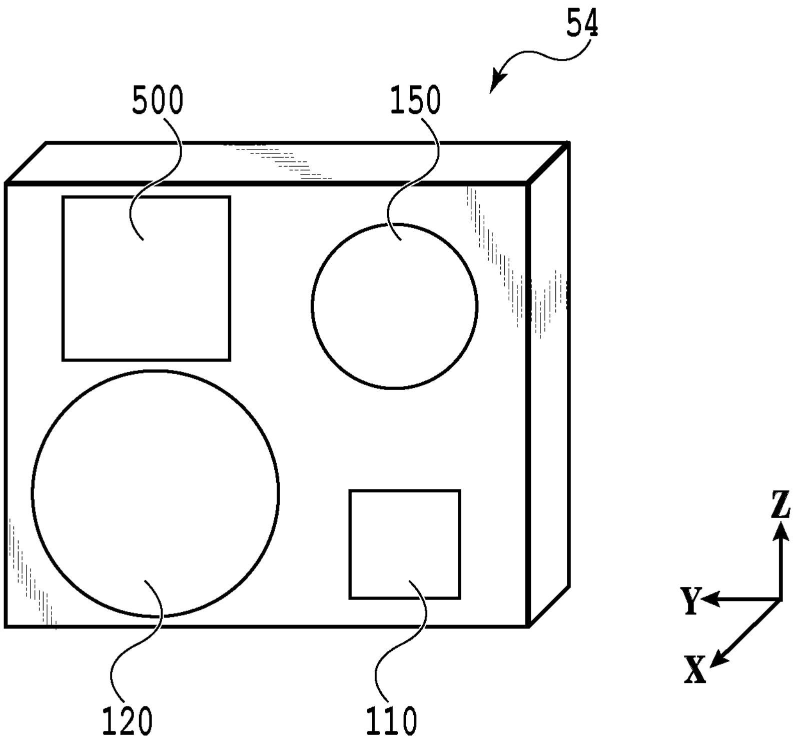
FIG. 3 is an external schematic view of a circulation unit.

FIG. 3 is an external schematic view of one circulation unit 54 corresponding to the ink of one type, which is applied to the printing apparatus of the present embodiment. In the circulation unit 54, a filter 110, a first pressure adjustment unit 120, a second pressure adjustment unit 150, and a circulation pump 500 are arranged. These constituent elements are connected by corresponding channels as shown in FIGS. 4 and 5 to constitute a circulation path through which the ink is supplied and collected in the liquid ejection head 1.

<Circulation Path in Liquid Ejection Head>

Figure 4:
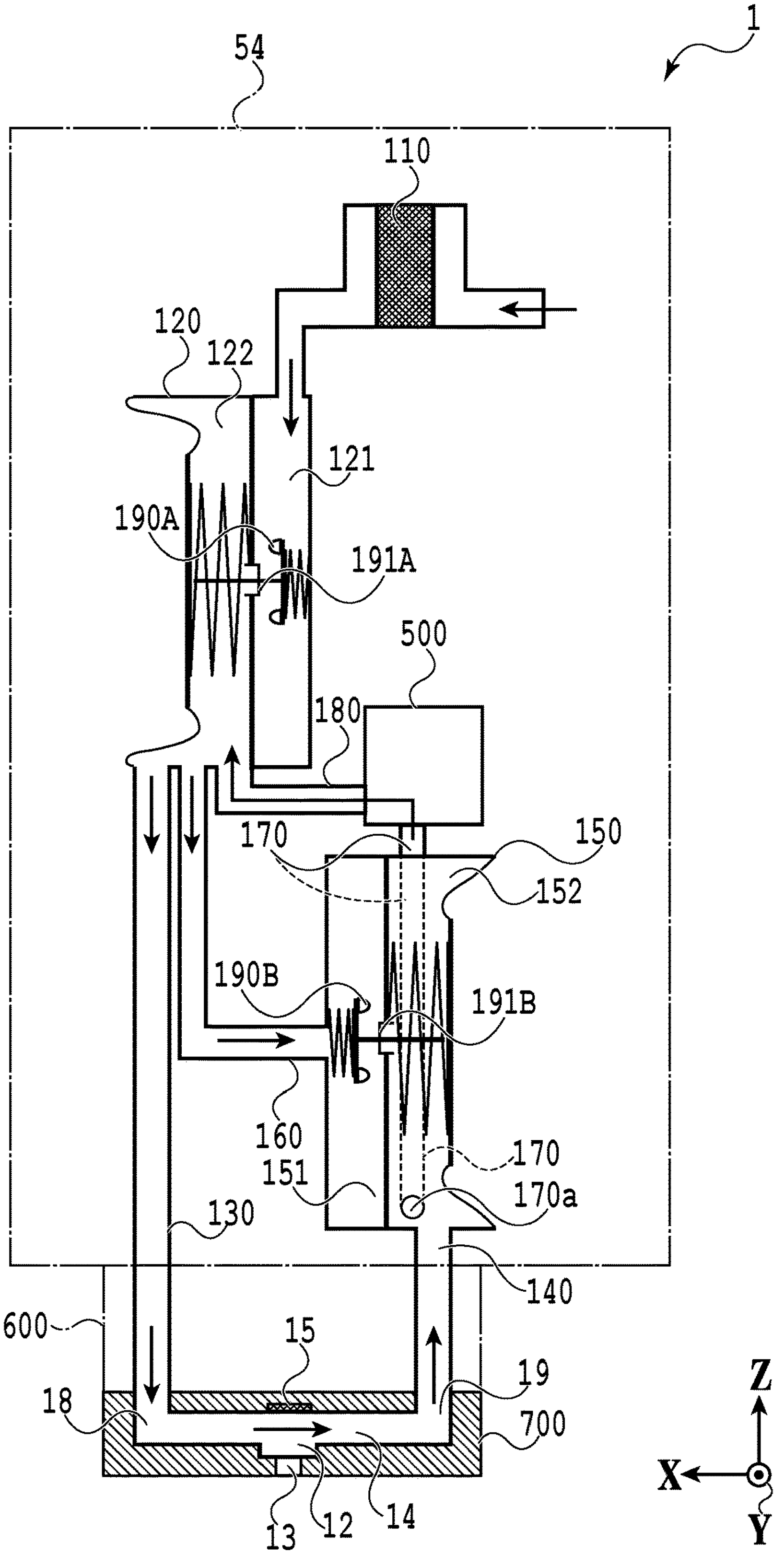
FIG. 4 is a vertical sectional view showing a circulation path.

FIG. 4 is a vertical sectional view schematically showing the circulation path for the ink of one type (ink of one color) configured in the liquid ejection head 1. FIG. 5 is a block diagram schematically showing the circulation path shown in FIG. 4. In order to more clearly explain the circulation path, the configurations and relative positions of the respective constituent elements (the first pressure adjustment unit 120, the second pressure adjustment unit 150, the circulation pump 500, the channel member 600, the ejection unit 700, and the like) in FIG. 5 are simplified. For this reason, the configurations and relative positions, and the like of the respective constituent elements are different from the specific configurations, which are described later.

Figure 5:
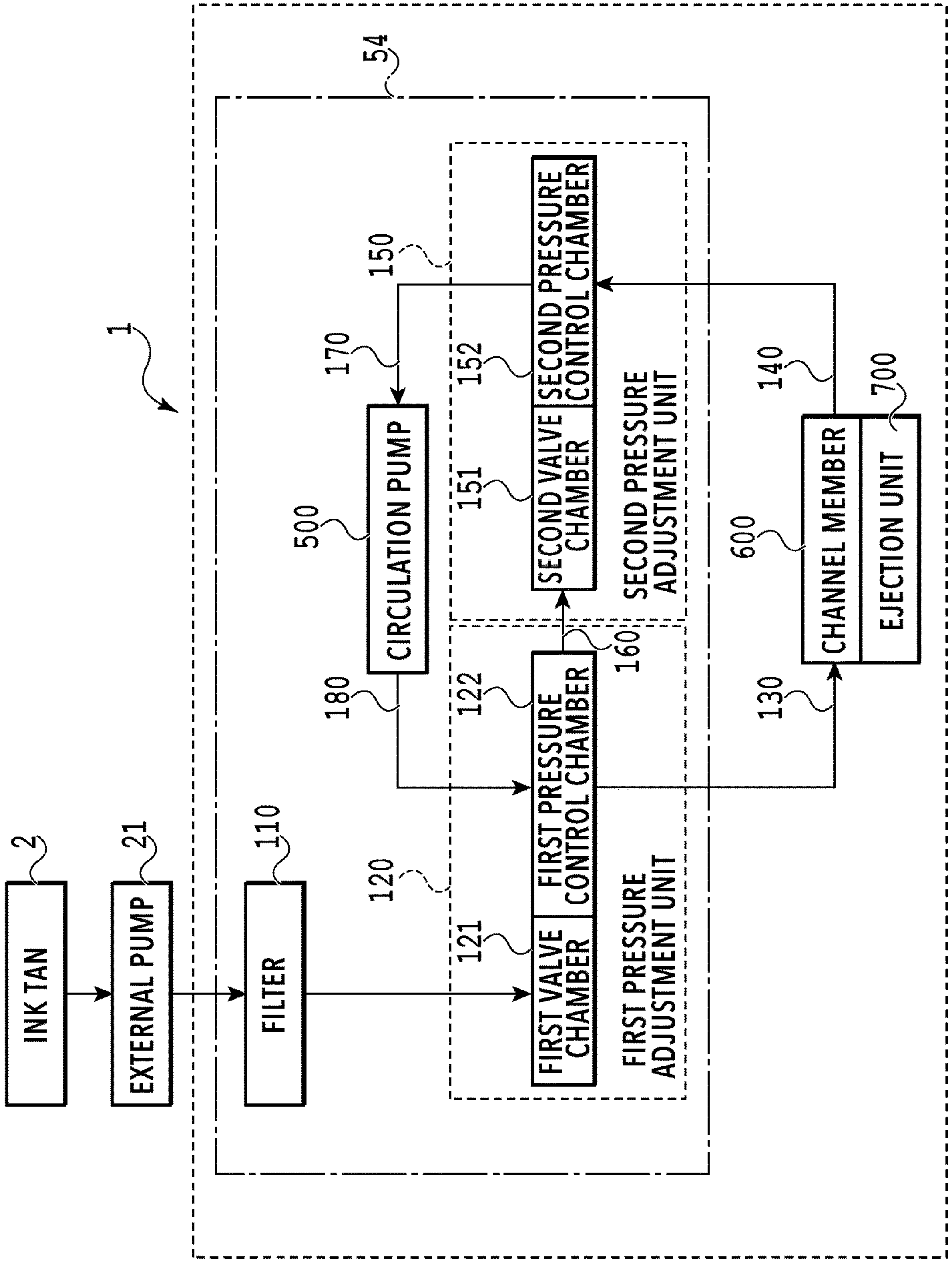
FIG. 5 is a block diagram schematically showing the circulation path.

As shown in FIGS. 4 and 5, the first pressure adjustment unit 120 includes a first valve chamber 121 and a first pressure control chamber 122. The second pressure adjustment unit 150 includes a second valve chamber 151 and a second pressure control chamber 152. The first pressure adjustment unit 120 is configured to have a control pressure relatively higher than that of the second pressure adjustment unit 150. In the present embodiment, circulation within a certain pressure range is achieved in the circulation path by using these two pressure adjustment units 120, 150. In addition, the ink is caused to flow through a pressure chamber 12 (the ejection element 15) at a flow rate corresponding to a difference in pressure between the first pressure adjustment unit 120 and the second pressure adjustment unit 150. Hereinafter, the circulation path in the liquid ejection head 1 and the flow of the ink in the circulation path will be described with reference to FIGS. 4 and 5. Note that arrows in the drawings indicate the directions in which the ink flows.

First, the connection states of the constituent elements in the liquid ejection head 1 will be described. The external pump 21 configured to send the ink stored in the ink tank 2 (FIG. 5), which is provided outside the liquid ejection head 1, to the liquid ejection head 1 is connected to the circulation unit 54 via the ink supply tube 59 (FIG. 1). In the ink channel located upstream of the circulation unit 54, the filter 110 is provided. The ink supply path located downstream of the filter 110 is connected to the first valve chamber 121 of the first pressure adjustment unit 120. The first valve chamber 121 communicates with the first pressure control chamber 122 via a communication port 191A which is opened and closed by a valve 190A (FIG. 4).

The first pressure control chamber 122 is connected to a supply channel 130, a bypass channel 160, and a pump outlet channel 180 of the circulation pump 500. The supply channel 130 is connected to a common supply channel 18 of the ejection unit 700 via a channel provided in the channel member 600, which will be described later. In addition, the bypass channel 160 is connected to the second valve chamber 151 provided in the second pressure adjustment unit 150. The second valve chamber 151 communicates with the second pressure control chamber 152 via a communication port 191B which is opened and closed by a valve 190B (FIG. 4) shown in FIG. 4. Note that FIGS. 4 and 5 show an example in which one end of the bypass channel 160 is connected to the first pressure control chamber 122 of the first pressure adjustment unit 120, and an opposite end of the bypass channel 160 is connected to the second valve chamber 151 of the second pressure adjustment unit 150. However, it is possible to connect the one end of the bypass channel 160 to the supply channel 130, and the opposite end of the bypass channel 160 to the second valve chamber 151.

The second pressure control chamber 152 is connected to a collection channel 140. The collection channel 140 is connected to a common collection channel 19 of the ejection unit 700 via a channel, which will be described later, provided in the channel member 600. Moreover, the second pressure control chamber 152 is connected to the circulation pump 500 via a pump inlet channel 170. Note that in FIG. 4, 170*a* denotes the inlet port of the pump inlet channel 170.

Next, the flow of the ink in the liquid ejection head 1 having the above-described configuration will be described. As shown in FIG. 5, the ink stored in the ink tank 2 is pressurized by the external pump 21 provided in the liquid ejection apparatus 50 to become an ink flow having a positive pressure, which is supplied to the circulation unit 54 of the liquid ejection head 1.

The ink supplied to the circulation unit 54 passes through the filter 110, where foreign substances such as dusts and bubbles are removed, and then flows into the first valve chamber 121 provided in the first pressure adjustment unit 120. Although the pressure of the ink decreases due to pressure drop in the ink passing through the filter 110, the pressure of the ink at this stage is in the state of positive pressure. Thereafter, the ink which has flowed into the first valve chamber 121 passes through the communication port 191A (FIG. 4) and flows into the first pressure control chamber 122 in a case where the valve 190A (FIG. 4) is open. The ink which has flowed into the first pressure control chamber 122 switches from the positive pressure to the negative pressure due to pressure drop in the ink passing through the communication port 191A.

Subsequently, the flow of the ink in the circulation path will be described. The circulation pump 500 is operated to send the ink suctioned from the upstream pump inlet channel 170 to the downstream pump outlet channel 180. Hence, the ink supplied to the first pressure control chamber 122 flows into the supply channel 130 and the bypass channel 160 by the driving of the circulation pump 500 together with the ink sent from the pump outlet channel 180. Note that in the present embodiment, a piezoelectric diaphragm pump having a piezoelectric element attached to a diaphragm as a drive source is used as the circulation pump capable of sending the liquid. The piezoelectric diaphragm pump is a pump configured to send the liquid by receiving a drive voltage inputted to the piezoelectric element to change the volume of the pump chamber and alternately moving two check valves due the valuation in pressure.

The ink which has flowed into the supply channel 130 flows into the pressure chamber 12 through a communication channel 14 from the channel of the channel member 600 and the common supply channel 18 of the ejection unit 700 as shown in FIG. 4. Part of the ink is ejected from the ejection port 13 by the drive (heat generation) of the ejection element 15. In addition, the remainder of the ink which has not been used for the ejection flows through the pressure chamber 12 and the communication channel 14, passes through the common collection channel 19, and then flows into the collection channel 140 connected to the channel of the channel member 600. The ink which has flowed into the collection channel 140 flows into the second pressure control chamber 152 of the second pressure adjustment unit 150.

On the other hand, the ink which has flowed from the first pressure control chamber 122 into the bypass channel 160 flows into the second valve chamber 151, and flows through the communication port 191B shown in FIG. 4 into the second pressure control chamber 152. The ink which has flowed into the second pressure control chamber 152 through the bypass channel 160 and the ink which has been collected from the collection channel 140 are suctioned into the circulation pump 500 through the pump inlet channel 170 by the drive of the circulation pump 500. Then, the ink which has been suctioned into the circulation pump 500 is sent to the pump outlet channel 180 and flows again into the first pressure control chamber 122.

In this way, the ink which has flowed from the first pressure control chamber 122 into the second pressure control chamber 152 through the supply channel 130 and the channel member 600 and the ink which has flowed into the second pressure control chamber 152 through the bypass channel 160 and the second valve chamber 151 flow into the circulation pump 500. Then, the ink which has flowed into the circulation pump 500 is sent to the first pressure control chamber 122. As described above, the ink is circulated in the circulation path.

As described above, in the present embodiment, it is made possible to circulate the liquid along the circulation path formed in the liquid ejection head 1 by the circulation pump 500. For this reason, it becomes possible to suppress thickening of the ink in the channel member 600 and sedimentation of the precipitated component of the ink of the color material, making it possible to maintain the fluidity of the ink in the channel member 600 and the ejection performance in the ejection port at favorable states.

In addition, since the circulation path in the present embodiment is completed within the liquid ejection head 1, it is possible to significantly shorten the length of the circulation path as compared with the case where the ink is circulated between the liquid ejection head 1 and the ink tank 2 provided outside the liquid ejection head 1. This makes it possible to circulate the ink with a small-sized circulation pump.

Moreover, this configuration only includes the channel for supplying the ink as a channel connecting the liquid ejection head 1 and the ink tank 2. That is, this configuration does not need a channel for collecting the ink from the liquid ejection head 1 to the ink tank 2. For this reason, only a tube for supplying the ink needs to be provided as connection between the ink tank 2 and the liquid ejection head 1, and there is no need to provide a tube for collecting the ink. Hence, it is possible to make the inside of the liquid ejection apparatus 50 with a simple configuration where the number of tubes is reduced, thus making it possible to achieve a reduction in size of the entire apparatus. Moreover, the reduction in the number of tubes makes it possible to reduce variations in pressure of the ink due to swinging of tubes associated with the main scanning of the liquid ejection head 1. In addition, the swinging of tubes at the time of main scanning of the liquid ejection head 1 becomes a drive load on the carriage motor for driving the carriage 60. For this reason, reduction in the number of tubes reduces the drive load on the carriage motor, thus making it possible to simplify the main scanning mechanism including the carriage motor and the like. Furthermore, since there is no need for collecting the ink from the liquid ejection head into the ink tank, it also becomes possible to reduce the size of the external pump 21. In this way, the present embodiment makes it possible to achieve reduction in size and cost of the liquid ejection apparatus 50.

(Configuration of Channel of Ejection Unit)

Next, the configuration of the channel of the ejection unit will be described with reference to FIGS. 6 to 8.

Figure 6:
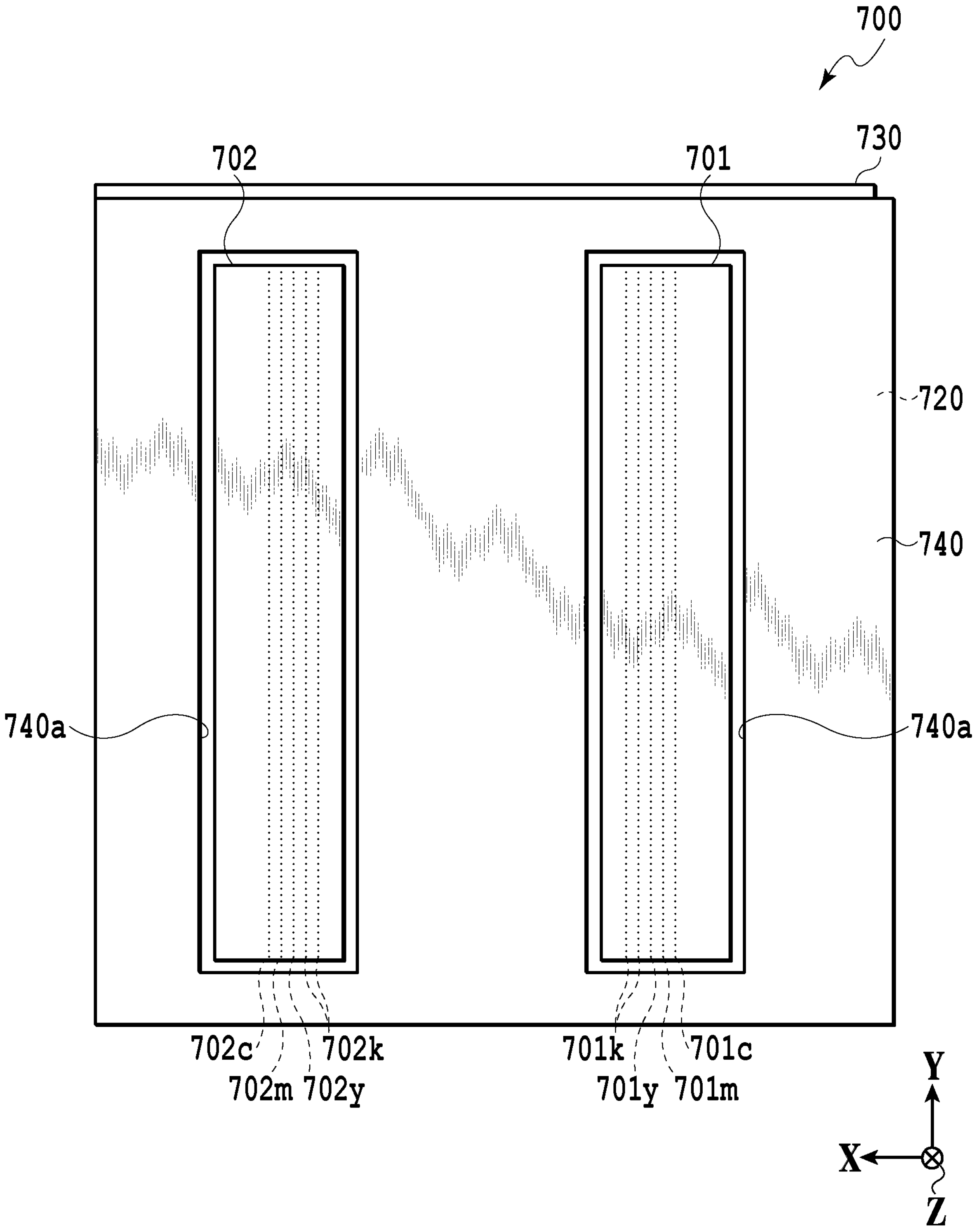
FIG. 6 is a diagram of an ejection unit as viewed from the ejection port face side of an ejection element substrate.

FIG. 6 is a diagram of the ejection unit 700 as viewed from the ejection port face (front face: bottom face in FIG. 2) side in which the ejection ports of the ejection element substrates 701, 702 are formed. As shown in FIG. 6, in the ejection unit 700, two ejection element substrates 701, 702 are arranged in the main scanning direction (X direction). As described above, these ejection element substrates 701, 702 are fixed by adhesion to the supporting member 720, and the ejection port faces are exposed through the openings of the cover member 740. These two ejection element substrates 701, 702 have ejection port arrays corresponding to the four types of inks. In one ejection element substrate 701, ejection port arrays 701*c*, 701*m*, 701*y*, 701*k* are arranged, while in the other ejection element substrate 702, ejection port arrays 702*c*, 702*m*, 702*y*, 702*k* are arranged. Here, 701*c*, 702*c* denote ejection port arrays for ejecting the ink of cyan, 701*m*, 702*m* denote ejection port arrays for ejecting the ink of magenta, and 701*y*, 702*y* denote ejection port arrays for ejecting the ink of yellow. These ejection port arrays are provided in each ejection element substrate in one line for each. In addition, 701*k*, 702*k* denote ejection port arrays for ejecting the ink of black. The ejection port arrays for ejecting the ink of black are provided in each ejection element substrate 701, 702 in two lines for each. Hence, five ejection port arrays are arranged in each ejection element substrate 701, 702.

The ejection port arrays arranged in each ejection element substrate 701, 702 are arranged in the main scanning direction (X direction) in the state of being mounted on the liquid ejection apparatus 50. In other words, in the one ejection element substrate 701, the ejection port arrays 701*c*, 701*m*, 701*y*, 701*k* are serially arranged from the right side of FIG. 6, while in the other ejection element substrate 702, the ejection port arrays 702*c*, 702*m*, 702*y*, 702*k* are serially arranged from the left side of FIG. 6. In this way, the ejection port arrays in the ejection element substrate 701 and the ejection port arrays in the ejection element substrate 702 are arranged line-symmetrically with respect to the line along the sub scanning direction (Y direction) between the one ejection element substrate 701 and the other ejection element substrate 702.

Figure 7:
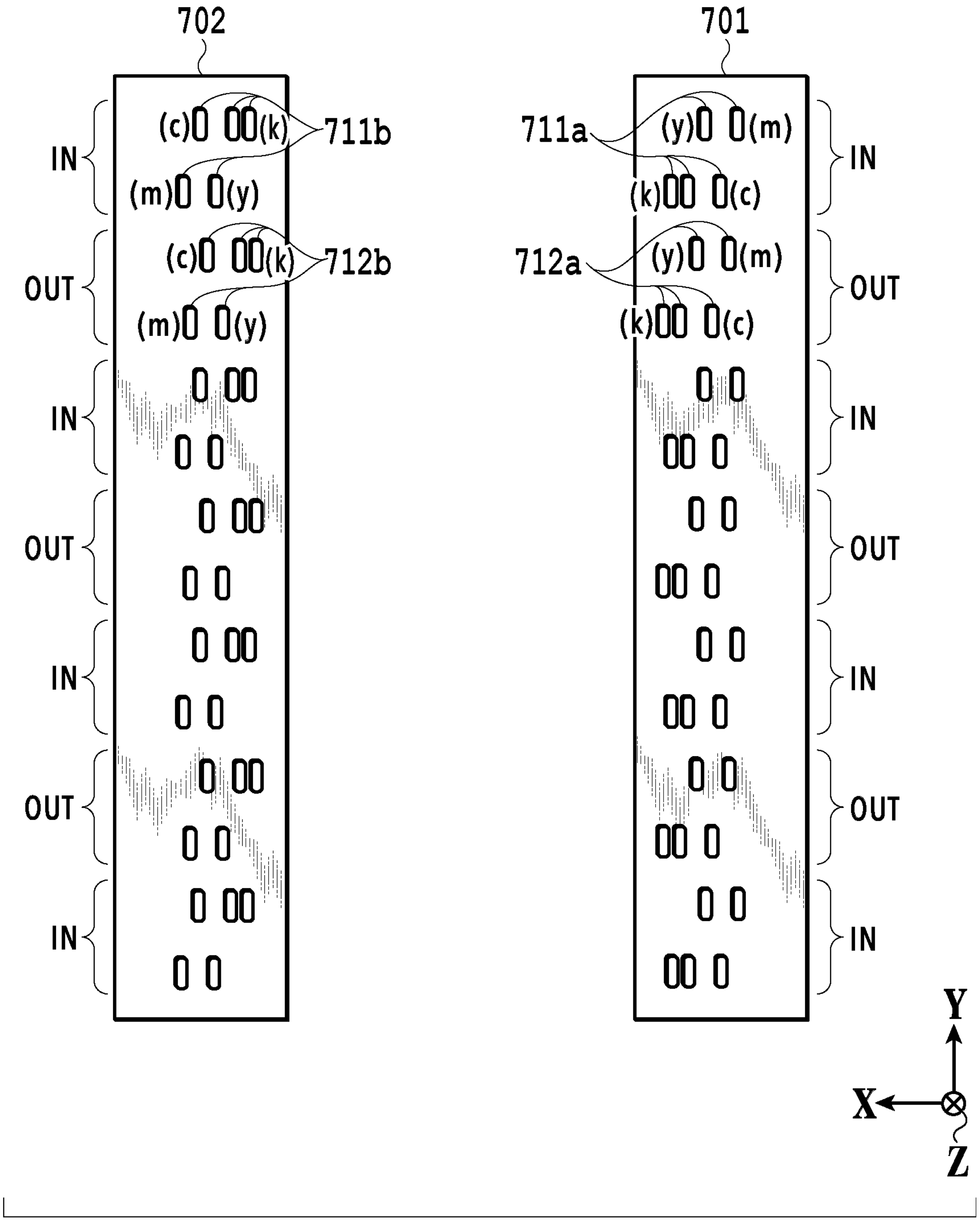
FIG. 7 is a diagram showing faces of the ejection element substrate on the opposite side to the ejection port face.

FIG. 7 is a diagram showing faces of the ejection element substrates 701, 702 on the opposite side to the ejection port faces (back face: the upper face in FIG. 2). As shown in FIG. 7, a plurality of openings which communicate respectively with the aforementioned plurality of ejection port arrays are formed in the back faces of the ejection element substrates 701, 702. Openings 711*a*, 711*b* indicated by IN (IN openings) in the ejection element substrates 701, 702 are openings for supplying the inks to the respective ejection port arrays. In addition, openings 712*a*, 712*b* indicated by OUT (OUT openings) in the ejection element substrates 701, 702 are openings for collecting the inks from the respective ejection port arrays. Note that (c), (m), (y), (k) in the figure indicate the types (colors) of the inks flowing in the corresponding openings.

Figure 8:
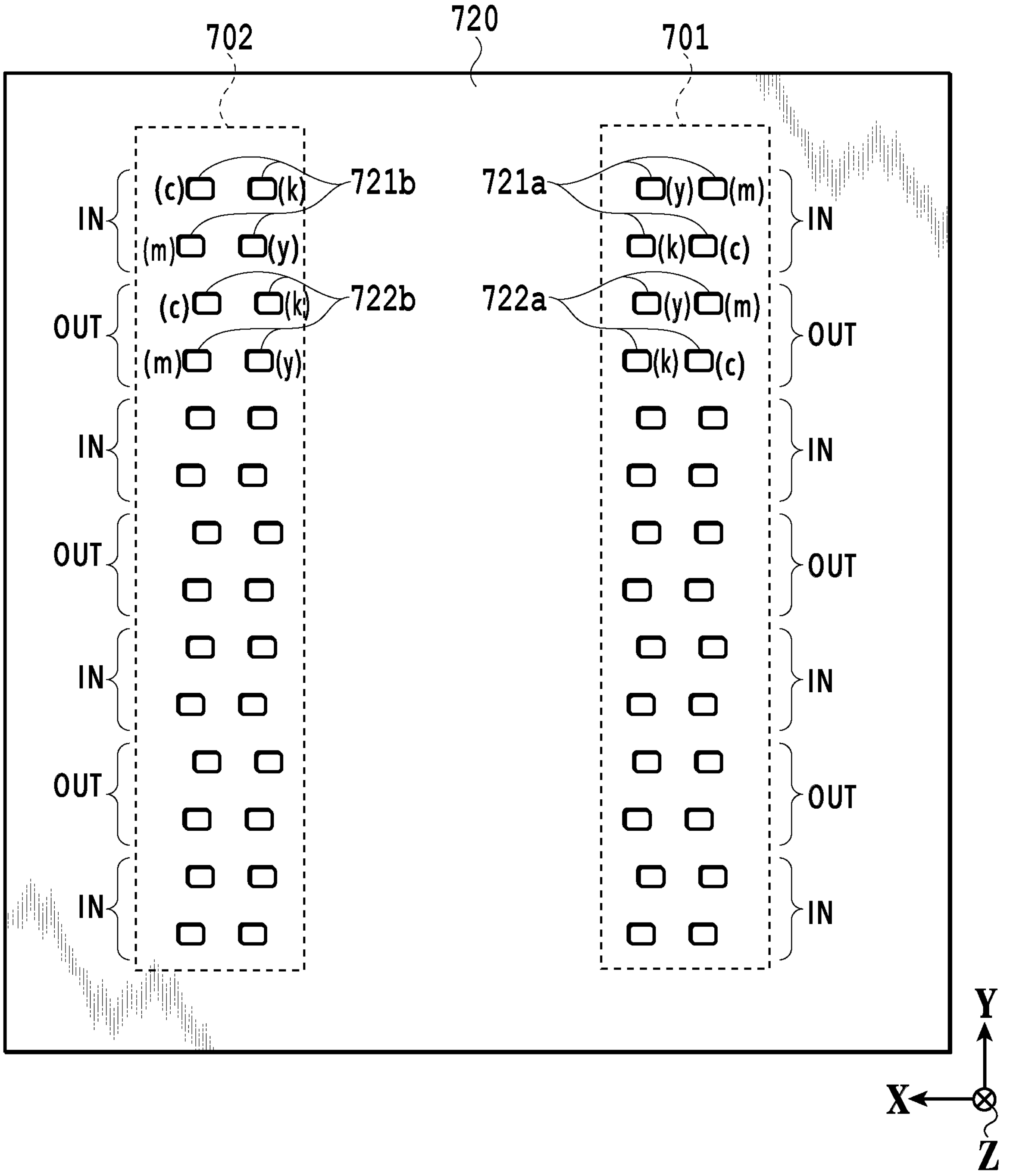
FIG. 8 is a diagram showing a back face of a supporting member.

FIG. 8 is a diagram showing the back face (the upper face in FIG. 2) of the supporting member 720. As shown in FIG. 8, a plurality of openings which communicate with the openings of the ejection element substrates 701, 702 are formed in the back face of the supporting member 720. Openings 721*a*, 721*b* indicated by IN in the supporting member 720 are openings which communicate respectively with the openings 711*a*, 711*b* of the ejection element substrates 701, 702. In addition, openings 722*a*, 722*b* indicated by OUT in the supporting member 720 are openings which communicate respectively with the openings 712*a*, 712*b* of the ejection element substrates 701, 702.

To the IN opening 721*a*, 721*b* of the supporting member 720, the ink is supplied from the supply channel 130 (FIG. 4) through the channel member 600, which will be described later. The ink supplied to the opening 721*a*, 721*b* flows into the common supply channel 18 (FIG. 4) through the IN opening 711*a*, 711*b* of the ejection element substrate 701, 702 shown in FIG. 7. Thereafter, the ink which has flowed into the common supply channel 18 flows into the communication channel 14 shown in FIG. 4, pass through the pressure chamber 12 and the ejection port 13, and then flows into the common collection channel 19. The ink which has flowed into the common collection channel 19 flows from the OUT opening 712*a*, 712*b* of the ejection element substrate 701, 702 shown in FIG. 7 into the supporting member 720 shown in FIG. 8. The ink which has flowed into the supporting member 720 flows from the OUT opening 722*a*, 722*b* of the supporting member 720 into the collection channel 140 of the circulation unit 54 shown in FIG. 4 through the channel member 600, which will be described later.

Note that although FIGS. 7 and 8 show an example including four IN openings and three OUT openings for each ejection port array, the present disclosure is not limited to this. The numbers of the IN openings and the OUT openings can be set to any other desired numbers. That is, it is possible to make the numbers of the IN openings and the OUT openings larger or smaller than those in the example shown. In addition, it is also possible to make the IN openings and the OUT openings as a single large opening extending across the entire ejection port array.

Meanwhile, in the liquid ejection head in the present embodiment, the ejection port arrays corresponding to the plurality of types of inks in the ejection element substrate 701 and the ejection port arrays corresponding to the plurality of types of inks in the ejection element substrate 702 are arranged in orders line-symmetric with each other. Such a so-called symmetric liquid ejection head makes it possible to unify the orders of applying the inks to a printing medium (printing orders) in both the forward scanning and the backward scanning of the liquid ejection head 1, making it possible to print an image having a favorable quality. In addition, conducting so-called bidirectional printing in which printing (ink ejection) is performed in both the forward scanning and the backward scanning makes it possible to form an image with a smaller scan count, and thus makes it possible to perform printing at a higher speed. In contrast, in a case where ejection port arrays corresponding to the respective ink colors are arranged one by one in a predetermined order in a liquid ejection head, a difference occurs in the order of applying each ink to a printing medium between the forward scanning and the backward scanning. For this reason, a difference occurs in the order of applying ink colors over one another in the formation of a secondary color, generating color unevenness in the image. The symmetric liquid ejection head of the present embodiment makes it possible to suppress generation of such color unevenness.

In addition, in the current liquid ejection apparatuses, it has been considered to introduce a circulation system in which a liquid in a liquid ejection head is circulated for the purposes of discharging bubbles in a channel or preventing ink thickening near an ejection port. The circulation system needs a circulation source for circulating a liquid for each ejection port array. For this reason, in a case where a circulation source is provided for each ejection port array in a symmetric liquid ejection head provided with two ejection port arrays for ejecting an ink of the same color, an issue occurs that the apparatus increases in size. In view of this, the liquid ejection head in the present embodiment has a configuration in which the channel member 600, which will be described below, is interposed between the circulation unit 54, which is a circulation source, and the ejection unit 700. This makes it possible to appropriately circulate the ink by using a single circulation source for a plurality of ejection port arrays for ejecting the ink of the same type (ink of the same color).

<Channel Configuration of Channel Member>

Figure 10:
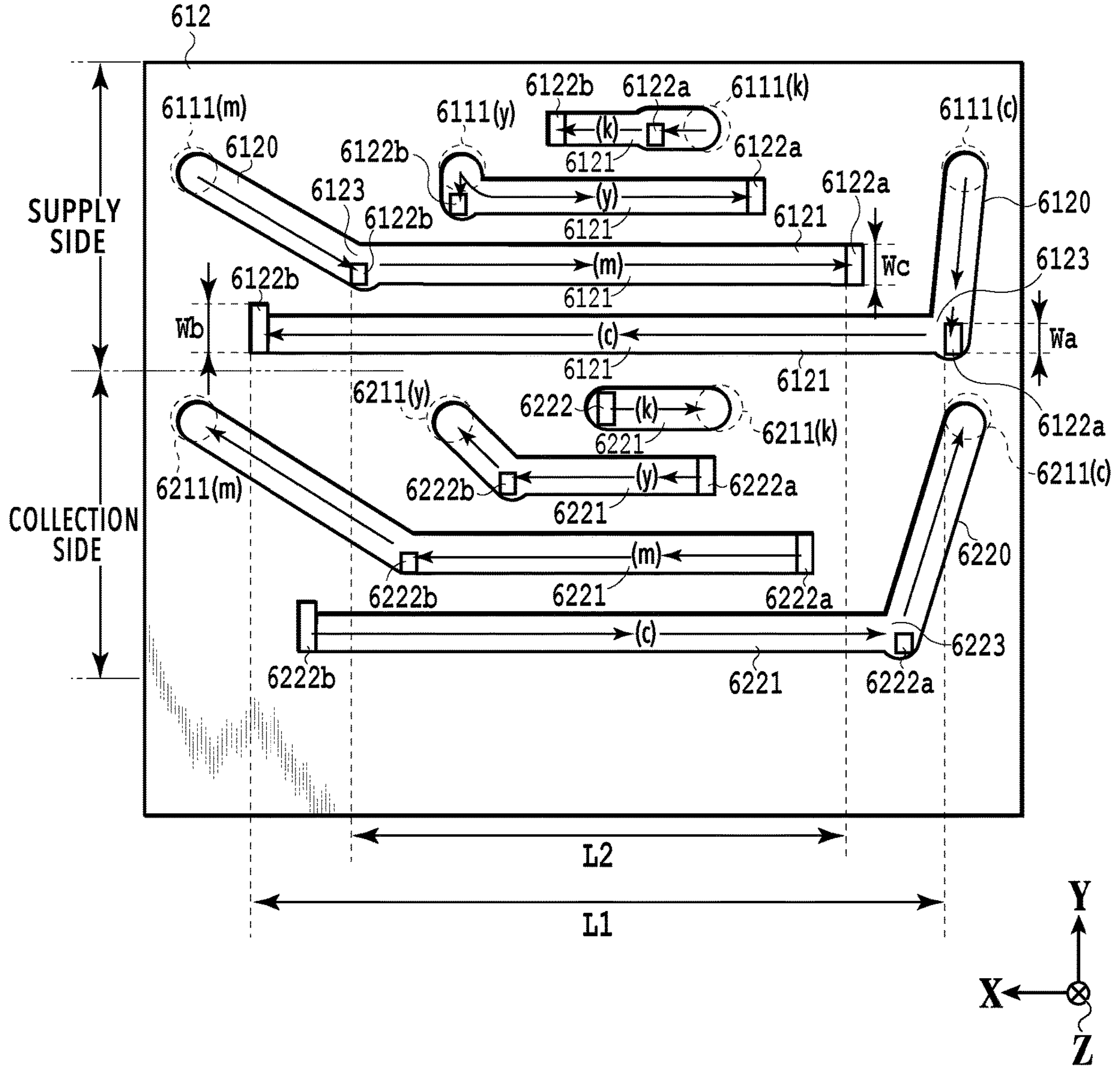
FIG. 10 is a diagram showing each channel of a second channel substrate.
Figure 11:
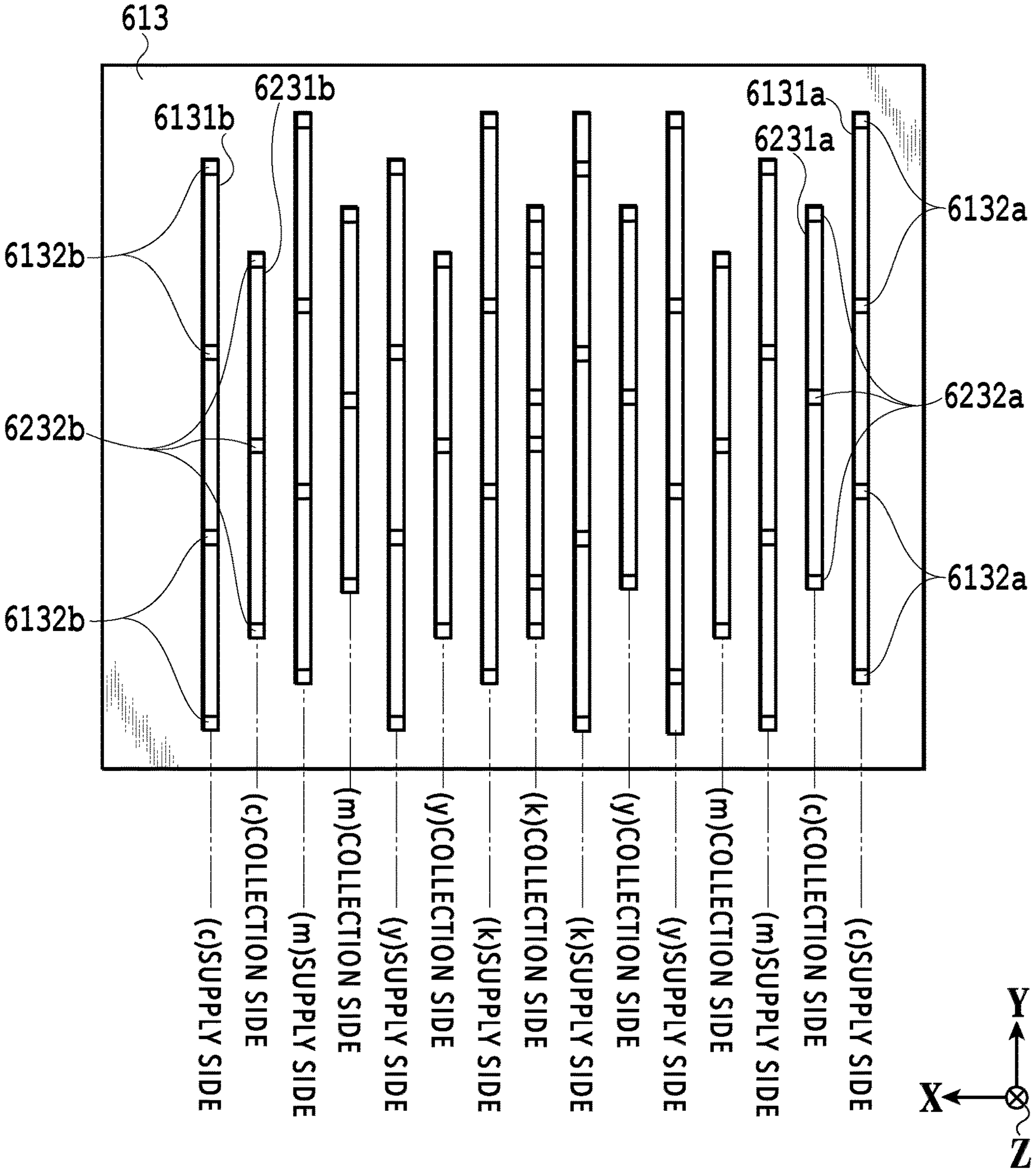
FIG. 11 is a diagram showing each channel of a third channel substrate.

Next, a channel configuration formed by the channel member 600 will be described with reference to FIG. 9A to FIG. 11. FIG. 9A is an exploded perspective view showing an entire configuration of the channel member 600, and FIG. 9B is a sectional view obtained by cutting the channel member 600 shown in FIG. 9A along the IXb-IXb line. In addition, FIG. 10 is a diagram showing each channel of a second channel substrate 612 provided in the channel member 600, and FIG. 11 is a diagram showing each channel of a third channel substrate 613. Note that in FIGS. 9A to 11, (c), (m), (y), (k) indicate ink colors flowing in the channels.

As shown in FIGS. 9A and 9B, the channel member 600 in the present embodiment has a layered structure composed of four substrates, that is, the first channel substrate 611, the second channel substrate 612, the third channel substrate 613, and a fourth channel substrate 614. A plurality of layered channels corresponding to the inks of a plurality of types are formed with channels formed in these four substrates. This channel member 600 functions as a channel forming member that forms channels used to supply and collect the inks to and from each ejection element substrate 701, 702 of the ejection unit 700 from the circulation unit 54. Moreover, the channel member 600 also functions as a housing unit 610 which houses the circulation unit 54 and functions as a supporting member which supports the electrical board 810 (FIG. 2).

Here, the layered channels for the inks which are formed in the channel member 600 will be described. Note that in the following description, the flow of the ink of cyan (hereinafter, referred to simply as the ink) among the plurality of types of inks, which are formed in the channel member 600 will be mainly described.

The ink which has passed through the supply channel 130 (FIG. 4) of the circulation unit 54*c* is supplied to the supply-side first connection channel 6111 formed in the first channel substrate 611 of the channel member 600 shown in FIGS. 9A and 9B. The ink which has been supplied to the first connection channel 6111 is supplied to a common channel 6120 formed in the second channel substrate 612 as shown in FIGS. 9A and 9B. The ink which has been supplied to the common channel 6120 branches at a branching point (connecting point) 6123 into a first individual channel which leads to the supply side of the ejection element substrate 701 and a second individual channel which leads to a common side of the ejection element substrate 702.

The first individual channel and the second individual channel which branch at the branching point 6123 are channels independent from each other. Although the detail will be described later, the ink which has reached the branching point 6123 flows into a second connection channel 6122*a* located directly below the branching point 6123, then passes through the supply-side channels of the third channel substrate 613 and the fourth channel substrate 614, and flows into the ejection element substrate 701 shown in FIGS. 2 and 7.

The ink which has flowed into the ejection element substrate 701 flows into the communication channel 14 shown in FIG. 4, passes through the pressure chamber 12 and the ejection port 13, and then passes through the collection-side channels of the fourth channel substrate 614 and the third channel substrate 613 and flows into a collection-side connection channel 6222*a* of the second channel substrate 612. The collection-side connection channel 6222*a* is located directly below a junction (connecting point) 6223, and the ink which has passed through the collection-side connection channel 6222*a* passes through a collection-side common channel 6220, and flows into a collection-side first connection channel 6211 of the first channel substrate 611 to return to the circulation unit 54. In this way, an ink circulation channel including the single circulation unit 54, which is a circulation source, and the ejection element substrate 701 is configured.

On the other hand, the ink which has been branched at the branching point 6123 from the second connection channel 6122*a* passes through a supply-side first horizontal channel (first plane channel) 6121, which extends in the X direction (main scanning direction) orthogonal to the array direction (Y direction) of the ejection ports in the plane direction, and flows into a second connection channel 6122*b*. The ink which has flowed into the second connection channel 6122*b* passes through the third channel substrate 613 and the fourth channel substrate 614, and flows into the ejection element substrate 702 shown in FIGS. 2 and 7.

Thereafter, the ink which has passed through the ejection element substrate 702 passes through the fourth channel substrate 614, the third channel substrate 613, and the collection-side second connection channel 6222*b* of the ejection element substrate 702, and flows into a collection-side first horizontal channel 6221. The ink which has flowed into the first horizontal channel 6221 meets the ink in the second connection channel 6222*a* at the junction 6223, and flows into the collection-side common channel 6220. The ink which has flowed into the common channel 6220 flows into the collection-side first connection channel 6211 of the first channel substrate 611 as described above, and returns to the circulation unit 54. In this way, an ink circulation channel including the circulation unit 54 and the ejection element substrate 702 is formed.

As described above, in the channel member 600, the supply-side common channel 6120 extending from the first connection channel 6111 to the branching point 6123 and the collection-side common channel 6220 extending from the junction (connecting point) 6223 to the first connection channel 6211 are formed. Moreover, the first individual channel is formed by the supply-side individual channel extending from the branching point 6123 to the ejection element substrate 701 and the collection-side individual channel extending from the ejection element substrate 701 to the junction 6223. In addition, the second individual channel is formed by the supply-side individual channel extending from the branching point 6123 to the ejection element substrate 701 and the collection-side individual channel extending from the ejection element substrate 702 to the junction 6223.

Next, a specific channel configuration and the flow of the ink in the channel member 600 will be described in more detail. Note that in the following description and reference drawings, reference signs with 'a' attached at the end denote channels in the first individual channel communicating with the ejection element substrate 701, and reference signs with b' attached at the end denote channels in the second individual channel communicating with the ejection element substrate 702.

The ink which has flowed into the common channel 6120 branches at the branching point 6123 into the second connection channel 6122*a* on one side and the first horizontal channel 6121 which communicates with the second connection channel 6122*b* on the other side. Both the second connection channels 6122*a*, 6122*b* are formed in the vertical direction, and the ink which has flowed into the second connection channels 6122*a*, 6122*b* is supplied to the third channel substrate 613.

The ink which has been supplied to the third channel substrate 613 flows into second horizontal channels 6131*a*, 6131*b* extending in the array direction (Y direction) of the ejection ports. A plurality of third connection channels 6132*a*, 6132*b* extending in the vertical direction communicate with each of the second horizontal channels 6131*a*, 6131*b*. In the present embodiment, as shown in FIG. 9A and FIG. 11, four supply-side third connection channels 6132*a*, 6132*b* communicate with each of the second horizontal channels 6131*a*, 6131*b*. These four third connection channels 6132*a*, 6132*b* correspond respectively to the four IN openings 711*a*, 711*b* of the ejection element substrates 701, 702 shown in FIG. 7.

The ink which has passed through the third connection channels 6132*a*, 6132*b* is supplied to the fourth channel substrate 614. In the fourth channel substrate 614, pitch conversion channels are formed to communicate with the IN openings 721*a*, 721*b* formed in the supporting member 720 of the ejection unit 700. For this reason, the ink which has been supplied to the supply-side channels of the fourth channel substrate 614 flows into the IN openings 721*a*, 721*b* formed in the supporting member 720. The ink which has flowed into the IN openings 721*a*, 721*b* passes through the IN openings 711*a*, 711*b* of the ejection element substrates 701, 702, and flows into the respective common supply channels 18 (FIG. 4) of the ejection element substrate 701 and the ejection element substrate 702.

The ink which has flowed into the respective common supply channels 18 of the ejection element substrate 701 and the ejection element substrate 702 passes through the pressure chamber 12 and the ejection port 13 along the communication channel 14. Thereafter, the ink passes through the common collection channel 19, and flows from the three OUT openings 712*a*, 712*b* (FIG. 7) formed in each of the ejection element substrates 701, 702 into the three OUT openings 722*a*, 722*b* of the supporting member 720.

The three OUT openings 722*a*, 722*b* of the supporting member 720 communicate with the collection-side channels of the fourth channel substrate 614 of the channel member 600. For this reason, the ink which has flowed into the supporting member 720 flows from the three OUT openings 722*a*, 722*b* into the collection-side channels of the fourth channel substrate 614. The collection-side channels of the fourth channel substrate 614 communicate respectively with collection-side third connection channels 6232*a*, 6232*b* (see FIG. 11) of the third channel substrate 613, and the third connection channels 6232*a*, 6232*b* communicate respectively with the collection-side second horizontal channels 6231*a*, 6231*b*. Hence, the ink which has flowed into the collection-side channels of the fourth channel substrate 614 passes through the three third connection channels 6232*a*, 6232*b* of the third channel substrate 613, and then flows into the collection-side second horizontal channels 6231*a*, 6231*b*.

Among the second horizontal channels 6231*a*, 6231*b*, the second horizontal channel 6231*a* on the one side communicates with the collection-side second connection channel 6222*a* of the second channel substrate 612 shown in FIG. 10. In addition, the second horizontal channel 6231*b* on the other side communicates with the collection-side second connection channel 6222*b* of the second channel substrate 612. For this reason, the ink which has passed through the three third connection channels 6232*a* on the one side merges into a single ink flow in the second horizontal channel 6231*a*, passes through the second connection channel 6222*a* on the one side located at the junction 6223 of the second channel substrate 612, and flows into the common channel 6220. In addition, the ink which has passed through the three third connection channels 6232*b* on the other side (FIG. 11) merges into a single ink flow in the second horizontal channel 6231*b*, passes through the second connection channel 6222*b* on the other side of the second channel substrate 612, and flows into the collection-side first horizontal channel 6221.

Thereafter, the ink which has flowed into the first horizontal channel 6221 merges with the ink which has flowed out of the second connection channel 6222*a* on the one side at the junction 6223, and flows into the collection-side common channel 6220. This common channel 6220 communicates with the collection-side first connection channel 6211 formed in the first channel substrate 611. For this reason, the ink which has flowed into the common channel 6220 is collected into the circulation unit 54 through the first connection channel 6211.

In this way, in the present embodiment, the ink can be supplied and collected by using the single circulation unit 54 for two ejection port arrays which are provided respectively in the ejection element substrate 701 and the ejection element substrate 702 and which eject the ink of the same type. For this reason, it becomes possible to reduce the size of the liquid ejection head 1 and significantly reduce the cost as compared with the case where a circulation unit is provided for each of two ejection port arrays.

Meanwhile, in the configuration of using a single circulation unit as described above, there is a case where a difference occurs in channel length between a channel which communicates with an ejection port array on one side and a channel which communicates with an ejection port array on the other side. In this case, the channel having a long channel length has a larger channel resistance than the channel having a short channel length, so that larger pressure drop is generated. Such a difference in pressure drop causes unevenness in the fluidity of the ink and the ejection performance in the ejection port arrays. In view of this, in the present embodiment, a difference in pressure drop caused by a difference in channel length is reduced by employing the following configuration.

<Difference in Pressure Drop Generated Between Channels for the Same Color>

As described above, in the liquid ejection head 1 of the present embodiment, the channels through which the two ejection port arrays configured to eject the ink of the same color and the single circulation unit communicate with each other include two individual channels (the first individual channel and the second individual channel). Here, in a case where the channel length of the first individual channel and the channel length of the second individual channel are compared, the channel length of the second individual channel is longer than the channel length of the first individual channel. That is, while the second individual channel includes the supply-side first horizontal channel 6121 and the collection-side first horizontal channel 6221 in the second channel substrate 612, the first individual channel does not include a horizontal channel in the second channel substrate 612. Hence, the channel length of the second individual channel is longer than the channel length of the first individual channel. Due to this difference in channel length, the pressure drop by the channel resistance of the second individual channel is larger than the pressure drop by the channel resistance of the first individual channel. For this reason, a phenomenon occurs in which a large amount of the ink circulates in the ejection port array of the ejection element substrate 701, which is connected to the first individual channel having a small pressure drop, while a sufficient amount of the ink does not flow in the ejection port array of the ejection element substrate 702. In this case, there is a possibility that thickening of the ink and retention of bubbles become likely to occur in the ejection port array of the second ejection element substrate, so that the frequency of occurrence of ejection failures is increased. In addition, in order to remove thickened ink and bubbles, even if a suction recovery process which forcibly suctions and discharges the ink from the ejection ports of each ejection port array is conducted, the ink is suctioned and discharged from only the ejection port array having a high ejection performance connected to a channel having a low pressure drop. For this reason, it is impossible to sufficiently restore the ejection performance of the ejection port array in which ejection failure has occurred. Hence, it is necessary to reduce the difference in pressure drop generated between different individual channels communicating with the respective ejection port arrays.

<Reduction in Difference in Pressure Drop between Channels for the Same Color>

In the present embodiment, in order to reduce a difference in pressure drop generated between individual channels corresponding to ejection port arrays for the same color, the second channel substrate 612 in the channel member 600 is configured as shown in FIG. 10.

On the supply side of the second channel substrate 612, the ink supplied to the common channel 6120 branches at the branching point 6123. That is, the ink which has reached the branching point 6123 flows into the second connection channel 6122*a* located directly below the branching point and into the second connection channel 6122*b* located at the end of the first horizontal channel 6121 through the first horizontal channel 6121. Here, the second connection channel 6122*a* on one side is a channel forming part of the first individual channel leading to the ejection element substrate 701, and the first horizontal channel 6121 and the second connection channel 6122*b* are a channel forming part of the second individual channel leading to the ejection element substrate 702. Hence, a difference occurs in channel length between the channel on the first individual channel side and the channel on the second individual channel side in the second channel substrate 612. As a result, the pressure in the second connection channel 6122*b* on the second individual channel side becomes lower than the pressure in the second connection channel 6122*a* on the first individual channel side. This is caused by pressure drop which is generated by the channel resistance generated in the first horizontal channel 6121 extending from the branching point 6123 to the second connection channel 6122*b*. Note that since the second connection channel 6122*a* is located directly below the branching point, no pressure drop by a horizontal channel in the second channel substrate 612 is generated.

In order to reduce a difference in pressure drop caused by a difference in channel length, the sectional area of the second connection channel 6122*b* is made larger than the sectional area of the second connection channel 6122*a*. Specifically, as shown in FIG. 10, the width (opening width) Wb of the sectional area of the second connection channel 6122*b* in the Y direction is made larger than the width (opening width) Wa of the sectional area of the second connection channel 6122*a* in the Y direction. This makes the pressure drop in the second connection channel 6122*b* smaller than the pressure drop in the second connection channel 6122*a*, thus reducing the difference in pressure drop between the first individual channel and the second individual channel on the supply side.

In addition, a difference in pressure drop caused by a difference in channel length is also generated in the collection-side channel. That is, while the second connection channel 6222*a* leading to the ejection element substrate 701 is located directly below the junction 6223, the first horizontal channel 6221 is present between the second connection channel 6222*b* leading to the ejection element substrate 702 and the junction 6223. For this reason, the channel length on the second individual channel side becomes longer than the channel length on the first individual channel side also on the COLLECTION SIDE, causing a difference in pressure drop. Hence, also on the COLLECTION SIDE, the opening width of the second connection channel 6222*b* is made larger than the opening width of the second connection channel 6222*a*, thus reducing the difference in pressure drop between the first individual channel and the second individual channel on the COLLECTION SIDE.

By reducing a difference in pressure drop caused by a difference in channel length between the first individual channel and the second individual channel in this way, it becomes possible to uniformly circulate the ink to the two ejection port arrays which eject the ink of the same color. Moreover, it becomes possible to properly perform the suction recovery process on each ejection port array. Hence, it becomes possible to maintain a proper and stable ejection performance in the two ejection port arrays which eject the ink of the same color for a long period of time.

Note that the adjustment of pressure drop can be performed in not only the second connection channel 6222*b* but also other channels. For example, pressure drop can be adjusted by using the second horizontal channel 6131*b*, the second connection channel 6132*b*, the pitch conversion channels of the fourth channel substrate 614, and the like. In addition, since the liquid ejection head 1 of the present embodiment is a scanning head which reciprocates in the main scanning direction, in a case where the sectional area of a channel is expanded by expanding the length of the section of the channel in the main scanning direction, oscillation pressure due to the main scanning increases. For this reason, in a case of expanding the sectional area of a channel, it is favorable to expand the sectional area in a direction orthogonal to the main scanning direction.

In addition, the adjustment of pressure drop is preferably performed at a portion where the flow rate of the ink is large. Specifically, since the flow rate of the ink is larger at a portion farther from the ejection port array and closer to the circulation unit 54, it is possible to obtain a larger effect from the adjustment of pressure drop by adjusting the sectional area of the channel at that portion. In the present embodiment, the sectional area is adjusted in the second connection channel 6122 which extends in the vertical direction to the main scanning direction, and is located at a position close to the circulation unit 54. Hence, it is possible to obtain a larger effect from the adjustment of pressure drop with a small effect of oscillation pressure.

Note that as the adjustment of pressure drop can be performed in channels other than the second connection channel 6122*b* as described above, the present disclosure encompasses performing the adjustment of pressure drop at these portions. However, a preferable portion is the second connection channel 6122*b*. For example, the second horizontal channel 6131*b* is a channel extending in the direction orthogonal to the main scanning direction, and is unlikely to be affected by oscillation pressure due to the main scanning. However, since the plurality of third connection channels 6132*b* communicate with this second horizontal channel 6131*b*, the flow rate of the ink in the second horizontal channel 6131*b* gradually decreases. For this reason, the adjustment of pressure drop becomes complicated. In addition, in the pitch conversion channel formed in the fourth channel substrate 614, the flow rate in the channel is uniform, but since the direction of extension of the channel is parallel with the scanning direction, the effect of the oscillation pressure is large. In addition, there is also a concern that since the flow rate of the ink in the channel is small, the effect obtained by the adjustment of the sectional area may decrease. In contrast, in the case where the adjustment of pressure drop is performed in the second connection channel 6122*b*, the above-described concerns do not occur, and a larger effect can be obtained.

<Difference in Pressure Drop Between Channels for Different Colors, and Difference in Pressure Drop Between Supply-Side Channel and Collection-Side Channel>

In a liquid ejection apparatus which ejects inks of a plurality of types (a plurality of colors), it is favorable to reduce not only a difference in pressure drop between channels for the same color, but also a difference in pressure drop between channels for different colors in making uniform the circulation flow rate of each ink color and the suction recovery operation. As shown in FIG. 9A to FIG. 11, all the plurality of ink channels provided for each ink color have substantially the same channel configuration. For example, the supply-side channel includes the first connection channel 6111*a*, the common channel 6120 extending from the first connection channel 6111*a* to the branching point 6123, and the first individual channel and the second individual channel extending from the branching point 6123 to the two ejection port arrays, for each ink color. In the collection-side channel as well, all the plurality of channels provided for each ink color have substantially the same channel configuration. However, the plurality of ink channels for different ink colors have channel lengths different from each other.

Here, focusing on the ink channel for the cyan ink (c channel) and the ink channel for the magenta ink (m channel) shown in FIG. 10, the channel length L1 of the first horizontal channel 6121 of the c channel is longer than that of the first horizontal channel 6121 of the m channel. That is, L1>L2. For this reason, the pressure drop generated in the first horizontal channel 6121 is larger in the c channel than in them channel. However, in the present embodiment, the width Wb of the second connection channel 6122*b* of the c channel is formed to be larger than the width We of the second connection channel 6122*b* of the m channel, so that the pressure drop generated in the second connection channel 6122 of the c channel is adjusted to be smaller than the pressure drop generated in the second connection channel 6122 of the m channel. In this way, in the present embodiment, the larger the channel length of the first horizontal channel 6121*b* is, the larger the sectional area of the second connection channel 6122*b* is made, to reduce the difference in pressure drop caused by the difference in channel length between the first horizontal channels 6121*b*.

In addition, there is also a case where a difference is generated in channel length between the supply-side channel and the collection-side channel. For example, in the example shown in FIG. 10, the supply-side first horizontal channel 6121 of the c channel is longer than the collection-side first horizontal channel 6221 of the c channel. For this reason, the pressure drop in the supply-side first horizontal channel 6121 is larger than the pressure drop in the collection-side first horizontal channel 6221. In view of this, in the present embodiment, the width Wa of the supply-side second connection channel 6122*a* is formed to be larger than the width of the collection-side second connection channel 6222*a*. This makes it possible to also reduce the difference in pressure drop between the supply-side channel and the collection-side channel.

As described above, in the present embodiment, it is possible to reduce the difference in pressure drop between channels for a plurality of colors, and a difference in pressure drop between the supply-side channel and the collection-side channel, in addition to the difference in pressure drop between two channels for the same color. This makes it possible to achieve uniform circulation flow rate in each channel and a proper recovery process in each ejection port array in the liquid ejection head 1. For this reason, it is possible to maintain a proper and stable ejection performance in the ejection performances of all the ejection port arrays for a long period of time.

Second Embodiment

Next, a second embodiment in the present disclosure will be described. Note that in the embodiments (the second embodiment to fourth embodiment, and the like) described below, portions different from the first embodiment will be mainly described, and detailed description of the same portions as in the first embodiment will be omitted.

Figure 12:
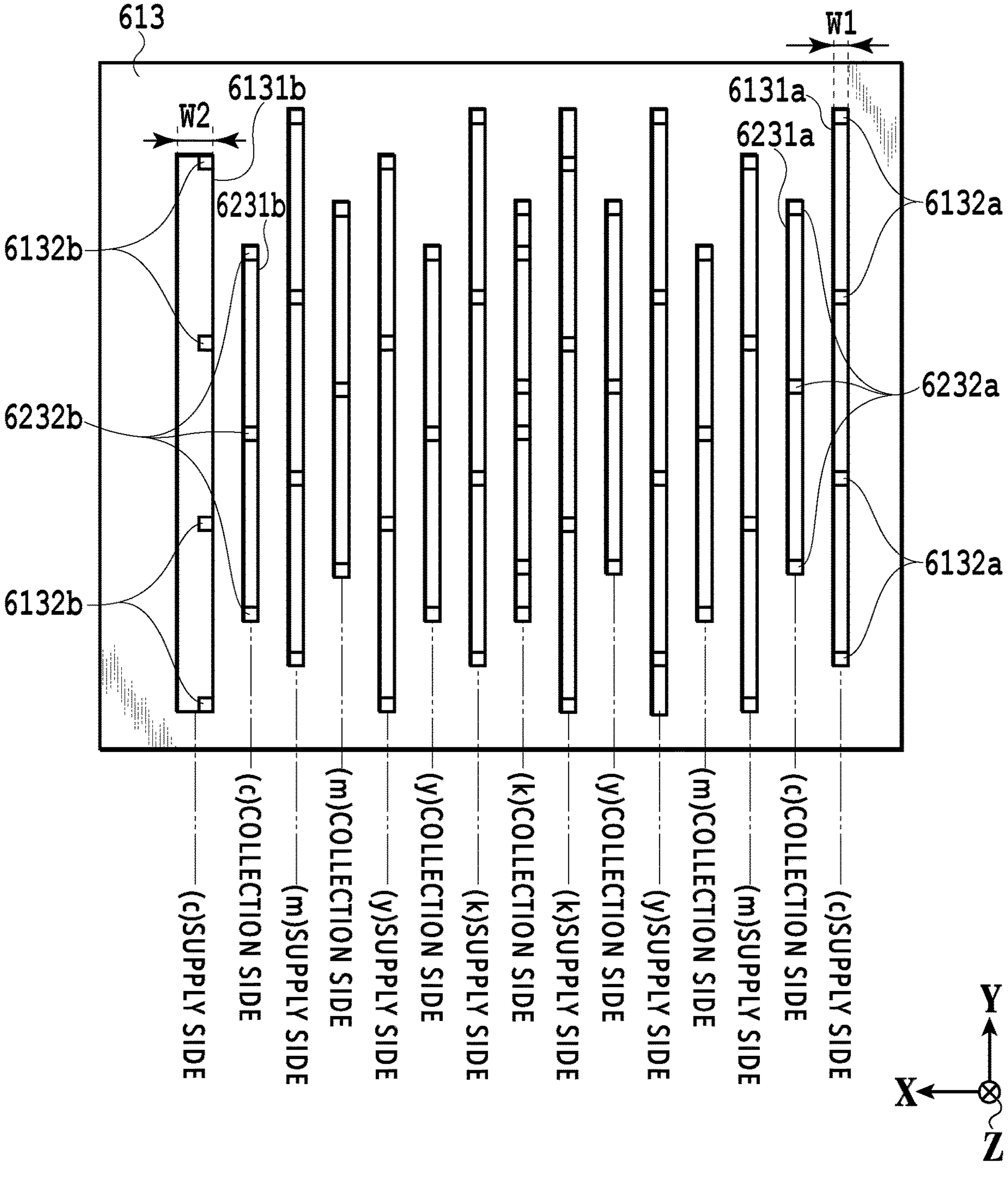
FIG. 12 is a diagram showing a third channel substrate in a second embodiment.

FIG. 12 is a diagram showing a third channel substrate 613 of a liquid ejection head 1 in the present embodiment. Like the aforementioned first embodiment, the ink is supplied to the second horizontal channel 6131*a* on the one side of the third channel substrate 613 from the second connection channel 6122*a* on the one side of the second channel substrate 612, while the ink is supplied to the second horizontal channel 6131*b* on the other side from the second connection channel 6123*b* on the other side. Here, the second connection channel 6122*a* on the one side is a channel located directly below the branching point 6123, and the second connection channel 6122*b* on the other side is a channel connected to the branching point 6123 through the first horizontal channel 6121. Thus, a difference in pressure drop is generated between the channel extending from the branching point 6123 through the second connection channel 6122*a* to the second horizontal channel 6131*a* and the channel extending from the branching point 6123 through the second connection channel 6122*b* to the second horizontal channel 6132*b*. In the first embodiment, this difference in pressure drop is reduced by adjusting (expanding) the sectional area of the second connection channel 6122*b*.

Against this, in the present embodiment, the sectional area of the second horizontal channel 6131*b* to which the ink which has passed through the first horizontal channel 6121 is supplied is made larger than the sectional area of the second horizontal channel 6131*a* on the other side. Specifically, as shown in FIG. 12, the width W2 of the sectional area of the second horizontal channel 6131*b* is made larger than the width W1 of the sectional area of the second horizontal channel 6131*a* on the other side. This makes it possible to reduce the difference in pressure drop between the channel extending from the branching point 6123 through the second connection channel 6122*a* to the second horizontal channel 6132*a* and the channel extending from the branching point 6123 through the second connection channel 6122*b* to the second horizontal channel 6132*b*. Note that since the second horizontal channel 6131*b* is a channel extending in the direction (Y direction) orthogonal to the main scanning direction (X direction), it is possible to reduce the effect of oscillation pressure due to the main scanning by adjusting the pressure drop in this second horizontal channel 6131*b*.

Note that although FIG. 12 shows the example in which the sectional area of the second horizontal channel 6131*b* in the supply-side c channel is made larger than that of the second horizontal channel 6131*a*, the sectional area of the second horizontal channel 6231*b* in the collection-side c channel may be made larger than that of the second horizontal channel 6231*a*. Moreover, not only the c channel, but also the sectional area of the second horizontal channel 6131*b*, 6231*b* of the channel for another ink color may be made larger than the sectional area of the second horizontal channel 6131*a*, 6231*a*. In addition, the pressure drop adjustment structure according to the first embodiment and the pressure drop adjustment structure according to the present embodiment may be combined. For example, the sectional areas of the second connection channel 6122*b*, 6222*b* and the second horizontal channel 6131*b*, 6231*b* may be made larger than the sectional areas of the second connection channel 6122*a*, 6222*a* and the second horizontal channel 6131*a*, 6231*a* based on a difference in channel length between the first individual channel and the second individual channel.

Third Embodiment

Figure 13:
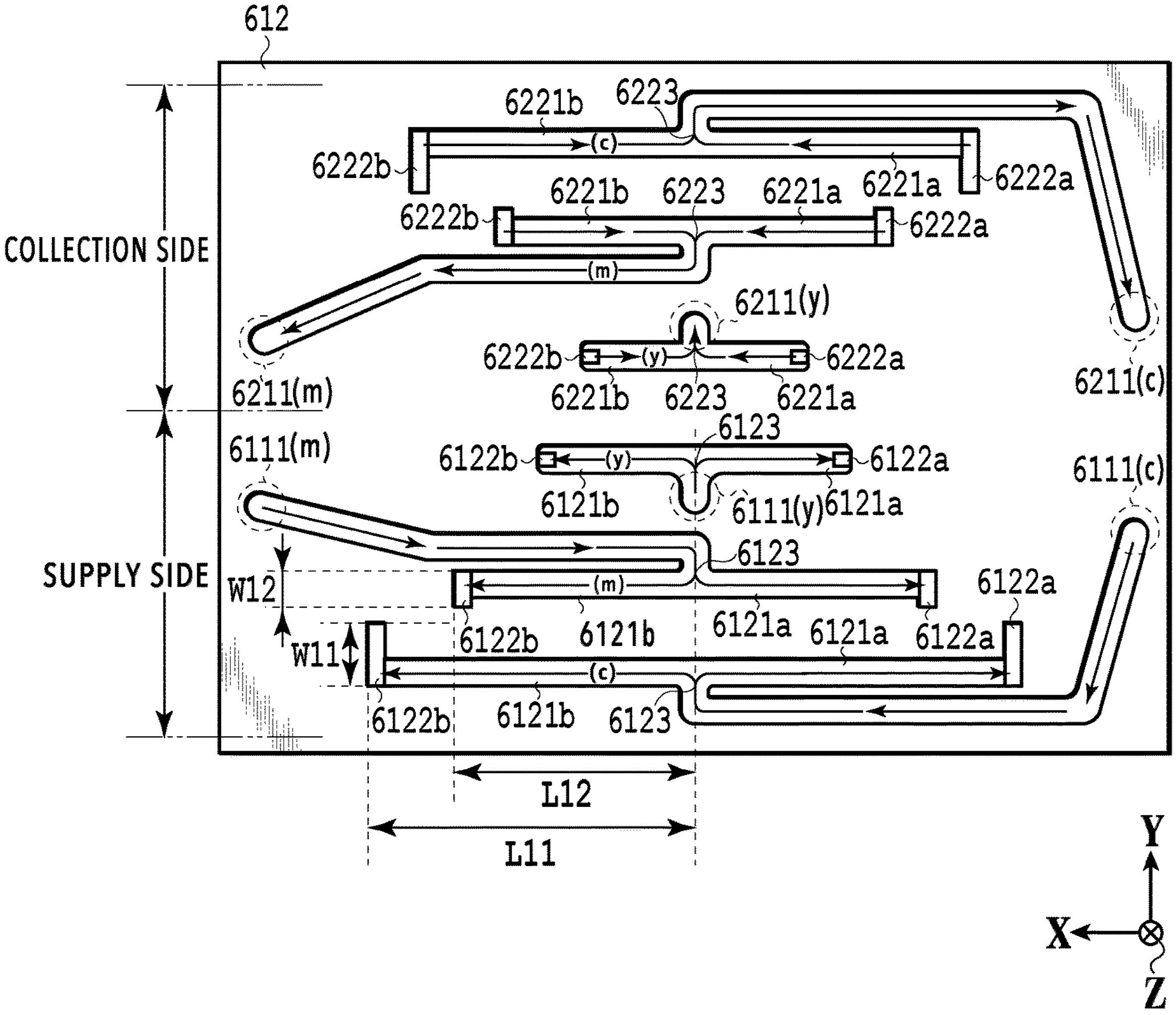
FIG. 13 is a diagram showing a second channel substrate in a third embodiment.

Next, a third embodiment of the present disclosure will be described. FIG. 13 is a diagram showing each channel of the second channel substrate 612 in the present embodiment. In the second channel substrate 612 shown in FIG. 13, the ink which has been supplied from the first connection channel 6111 branches at the branching point 6123 into the first horizontal channel 6121*a* and the first horizontal channel 6121*b*. The ink thus having branched flows into the second connection channel 6122*a* and the second connection channel 6122*b*. Here, the first horizontal channel 6121*a* on the one side and the first horizontal channel 6121*b* on the other side have an equal channel length.

In addition, in the collection-side channel as well, the second horizontal channel 6221*a* extending from the second connection channel 6222*a* to the junction 6223 and the second horizontal channel 6221*b* extending from the second connection channel 6222*b* to the junction 6223 have an equal channel length. Hence, among the two ejection port arrays for the same color, the channel length of the first individual channel communicating with the ejection port array on the one side and the channel length of the second individual channel communicating with the ejection port array on the other side are equal, so that no difference is generated in pressure drop between the individual channels. Thus, it is possible to achieve uniform ink circulation of each individual channel for the same color and a uniform suction recovery operation of each ejection port array for the same color.

Note that in the following description in the present embodiment and description in a fourth embodiment which will be described later, the supply-side second connection channels 6122*a* and 6122*b* are collectively referred to as second connection channels 6122, and the first horizontal channels 6121*a* and 6121*b* are collectively referred to as first horizontal channels 6121. In addition, on the COLLECTION SIDE as well, the second connection channels 6222*a* and 6222*b* are referred to as second connection channels 6222, and the first horizontal channels 6221*a* and 6221*b* are collectively referred to as first horizontal channels 6221.

In the second channel substrate 612 in the present embodiment, there are differences among the respective channel lengths of the plurality of channels provided for each ink color. For this reason, differences are generated in the pressure drops generated respectively in the plurality of channels provided for each ink color. In order to reduce this difference in pressure drop, the longer the first horizontal channels 6121 and 6221 are, the larger the sectional areas of the second connection channels 6122, 6222 are made.

For example, the channel length L11 of the first horizontal channel 6121 in the c channel is longer than the channel length L12 of the first horizontal channel 6121 in the m channel. That is, L11>L12. For this reason, the sectional area of the second connection channels 6122, 6222 in the c channel is made larger than the sectional area of the second connection channels 6122, 6222 in the m channel. Specifically, the width W11 of the second connection channel 6122 in the c channel is made larger than the width W12 of the second connection channel 6122 in the m channel. This makes it possible to reduce the difference in pressure drop caused by the difference in channel length of channels for different colors, and thus makes it possible to reduce a variation in circulation flow rate in the channels for different colors and a variation in the amount of the inks suctioned in the suction recovery process. In addition, in the present embodiment as well, since the sectional areas of the channels are adjusted in the direction (Y direction) orthogonal to the main scanning direction, it is possible to reduce the effect caused by changes in oscillation pressure due to the main scanning.

Note that it is also possible to reduce the difference in pressure drop caused by the difference in channel length among the plurality of channels for different colors by adjusting the sectional areas of the second horizontal channels 6131*a*, 6131*b*, and 6231*a*, 6231*b* formed in the third channel substrate 613. Since the second horizontal channels formed in the third channel substrate 613 are channels extending in the main scanning direction, the effect of oscillation pressure is so small that the same effect as in the example shown in FIG. 13 can be obtained.

In addition, the present embodiment has the channel configuration on the assumption of a liquid ejection head using inks of three colors cyan, magenta, and yellow, but can also include channels for using black ink as in the case of the first embodiment. In this case, in the channels for black as well, it is possible to reduce a difference in pressure drop by adjusting the sectional areas of the second connection channels or the second horizontal channels depending on a difference in channel length from the channels for another ink color.

Fourth Embodiment

Figure 14:
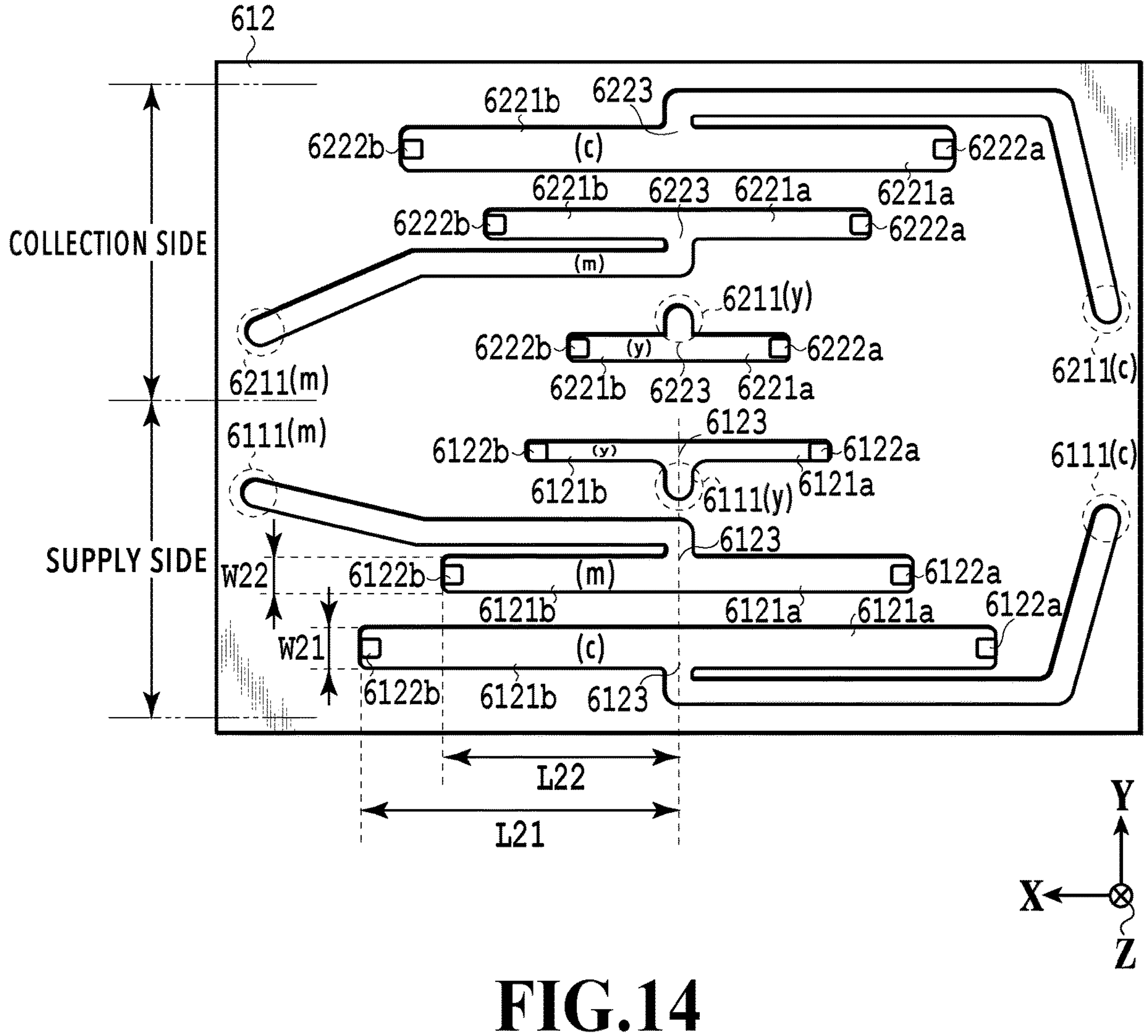
FIG. 14 is a diagram showing a second channel substrate in a fourth embodiment.

Next, a fourth embodiment of the present disclosure will be described. FIG. 14 is a diagram showing each channel of the second channel substrate 612 in the present embodiment. Like the third embodiment, in the second channel substrate 612 in the present embodiment, among the two ejection port arrays for the same color, the channel length of the first individual channel communicating with the ejection port array on the one side and the channel length of the second individual channel communicating with the ejection port array on the other side are equal. For this reason, the pressure drops generated in the respective individual channels for the same color are equal, and it is possible to uniformly conduct the ink circulation of each individual channel of the same color and the suction recovery process on the ejection port arrays for the same color.

On the other hand, a difference is generated in channel length of the first horizontal channels 6121 among the channels for different colors, and this generates a difference in pressure drop among the channels for different colors. For this reason, the longer the first horizontal channel 6121 is, the larger the sectional area of the first horizontal channel 6121 is made. In the example shown in FIG. 14, the channel length L21 of the first horizontal channel 6121 in the c channel is longer than the channel length L22 of the first horizontal channel 6121 in them channel. For this reason, the width W21 of the first horizontal channel 6121 in the c channel is made larger than the width W22 of the first horizontal channel in the m channel.

This makes it possible to reduce a difference in pressure drop caused by a difference in channel length among channels for different colors, and thus makes it possible to reduce a variation in circulation flow rate in the channels for different colors and a variation in the amounts of the inks suctioned in the suction recovery process. In addition, in the present embodiment, since the channel sectional areas of the first horizontal channels 6121, 6221 extending in the direction parallel with the scanning direction are expanded, there is a possibility that the effect of oscillation pressure due to the main scanning increases in the expanded channels. However, since the effect due to a difference in pressure drop is larger than the effect of oscillation pressure, the adjustment of pressure drop in the present embodiment is effective. Particularly, the present embodiment is effective in a case where the modes such as the first and second embodiments cannot be employed.

Next, a specific example of a pressure adjustment unit used in the above-described embodiments will be described.

<Pressure Adjustment Unit>

Figure 15A:
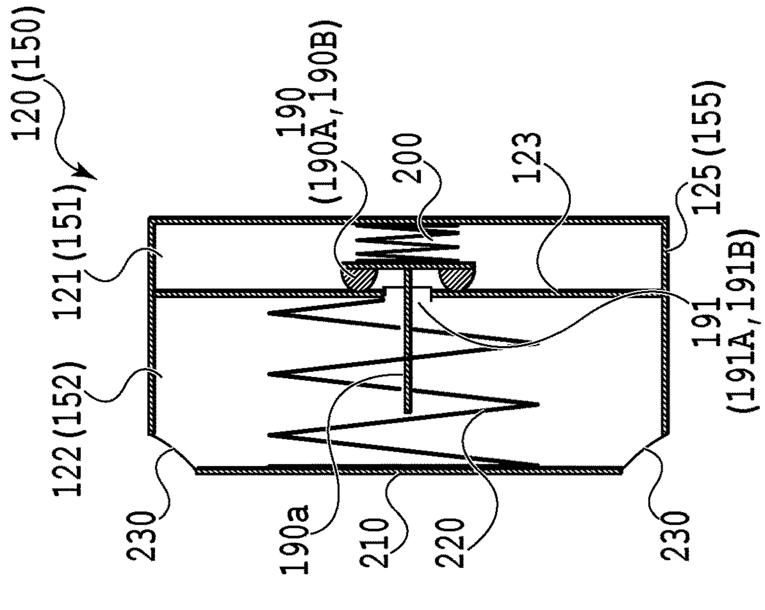
FIGS. 15A to 15C are diagrams showing a specific configuration and operation of a pressure adjustment unit.
Figure 15B:
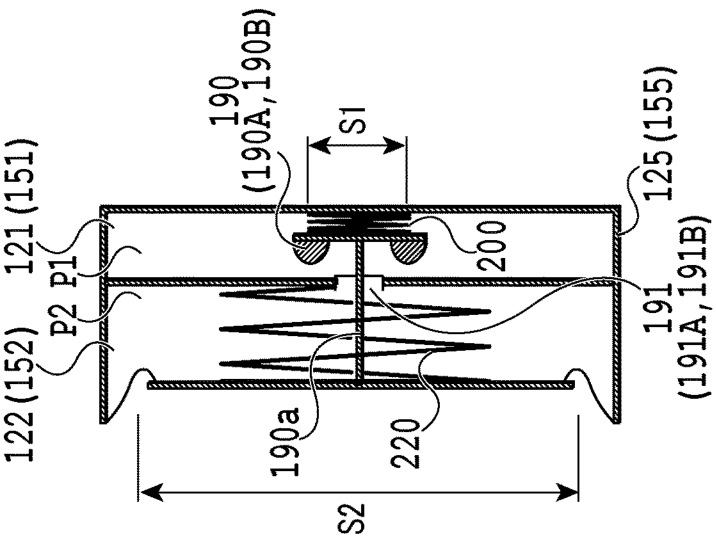
Figure 15C:
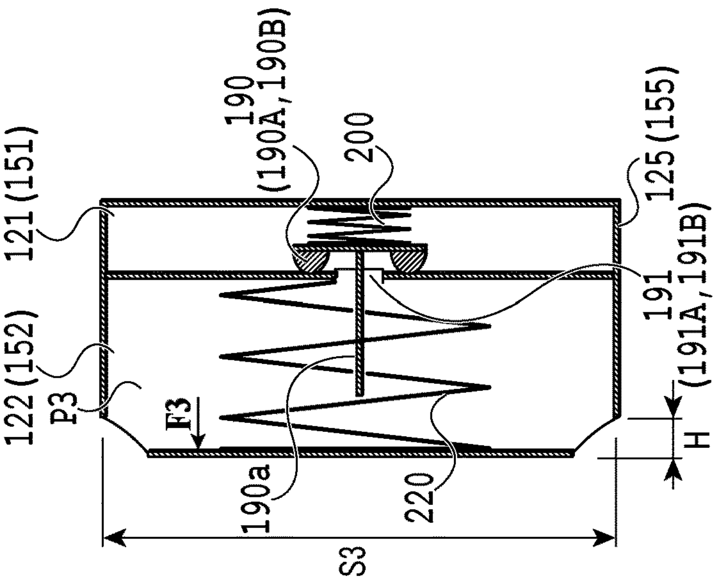

FIGS. 15A to 15C are diagrams showing a specific configuration and operation of a pressure adjustment unit (the first pressure adjustment unit 120, the second pressure adjustment unit 150) incorporated in the above-described liquid ejection head 1. Note that the first pressure adjustment unit 120 shown in FIGS. 15A to 15C and the second pressure adjustment unit 150 have substantially the same configuration. For this reason, the first pressure adjustment unit 120 will be described as an example below, and for the second pressure adjustment unit 150, only reference signs of portions corresponding to those in the first pressure adjustment unit 120 are given in FIGS. 15A to 15C. In the case of the second pressure adjustment unit 150, the first valve chamber 121 described below is read as the second valve chamber 151, and the first pressure control chamber 122 is read as the second pressure control chamber 152.

The first pressure adjustment unit 120 includes a first valve chamber 121 and a first pressure control chamber 122 formed in a cylindrical casing 125. The first valve chamber 121 and the first pressure control chamber 122 are separated by a partition 123 provided in the cylindrical casing 125. However, the first valve chamber 121 communicates with the first pressure control chamber 122 via a communication port 191 formed in the partition 123. The first valve chamber 121 is provided with a valve 190 configured to switch communication and shut-down between the first valve chamber 121 and the first pressure control chamber 122 in the communication port 191. The valve 190 is held at a position facing the communication port 191 by a valve spring 200, and is configured to be capable of being brought into tight contact with the partition 123 by a biasing force of the valve spring 200. As the valve 190 comes into tight contact with the partition 123, the flow of the ink through the communication port 191 is shut down. Note that in order to enhance the tight contact with the partition 123, the portion of the valve 190 which comes into contact with the partition 123 is preferably formed of an elastic member. In addition, on a center portion of the valve 190, a valve shaft 190*a* which is inserted through the communication port 191 protrudes. By pressing this valve shaft 190*a* against the biasing force of the valve spring 200, the valve 190 is separated from the partition 123, enabling the flow of the ink through the communication port 191. Hereinafter, the state where the flow of the ink through the communication port 191 is shut down by the valve 190 is referred to as a "closed state", and the state where the flow of the ink through the communication port 191 is enabled is referred to as an "open state".

The opening portion of the cylindrical casing 125 is closed by a flexible member 230 and a pressure plate 210. The first pressure control chamber 122 is formed by the flexible member 230, the pressure plate 210, the peripheral wall of the casing 125, and the partition 123. The pressure plate 210 is configured to be displaceable in association with displacement of the flexible member 230. The materials of the pressure plate 210 and the flexible member 230 are not particularly limited, but for example, it is possible to form the pressure plate 210 of a resin molded member and the flexible member 230 of a resin film. In this case, the pressure plate 210 can be fixed to the flexible member 230 by thermal fusion.

Between the pressure plate 210 and the partition 123, a pressure adjustment spring 220 (biasing member) is provided. The pressure plate 210 and the flexible member 230 are biased by the biasing force of the pressure adjustment spring 220 in the direction in which the inner volume of the first pressure control chamber 122 is expanded, as shown in FIG. 15A. In addition, as the pressure inside the first pressure control chamber 122 decreases, the pressure plate 210 and the flexible member 230 are displaced in the direction in which the inner volume of the first pressure control chamber 122 decreases, against the pressure of the pressure adjustment spring 220. Then, as the inner volume of the first pressure control chamber 122 decreases to a certain amount, the pressure plate 210 comes into contact with the valve shaft 190*a* of the valve 190. Thereafter, as the inner volume of the first pressure control chamber 122 further decreases, the valve 190 moves together with the valve shaft 190*a* against the biasing force of the valve spring 200 to separate from the partition 123. In this way, the communication port 191 is brought into the open state (the state of FIG. 15B).

In the present embodiment, the connection setting inside the circulation path is made such that the pressure of the first valve chamber 121 with the communication port 191 brought into the open state becomes higher than the pressure of the first pressure control chamber 122. This causes the ink to flow from the first valve chamber 121 into the first pressure control chamber 122 when the communication port 191 is brought into the open state. This flow-in of the ink displaces the flexible member 230 and the pressure plate 210 in the direction in which the inner volume of the first pressure control chamber 122 increases. As a result, the pressure plate 210 separates from the valve shaft 190*a* of the valve 190, and the valve 190 is brought into tight contact with the partition 123 by the biasing force of the valve spring 200, so that the communication port 191 is brought into the closed state (the state of FIG. 15C).

In this way, in the first pressure adjustment unit 120 of the present embodiment, once the pressure inside the first pressure control chamber 122 decreases to a certain pressure or lower (for example, once the negative pressure is increased), the ink flows from the first valve chamber 121 through the communication port 191 into the first pressure control chamber 122. In this way, the first pressure adjustment unit 120 is configured such that the pressure of the first pressure control chamber 122 does not decrease any more. Hence, the first pressure control chamber 122 is controlled to be maintained at a pressure within a certain range.

Next, the pressure of the first pressure control chamber 122 will be described in more detail.

Consider a situation in which the flexible member 230 and the pressure plate 210 were displaced in response to the pressure of the first pressure control chamber 122 as described above, and caused the pressure plate 210 to come into contact with the valve shaft 190*a*, so that the communication port 191 was brought into the open state (the state of FIG. 15B). At this time, a relation of forces acting on the pressure plate 210 is represented by the following formula 1.

$$P2 \times S2 + F2 + (P1 - P2) \times S1 + F1 = 0 \quad \text{formula 1}$$

Further, if the formula 1 is rearranged in terms of P2, $$P2 = -(F1 + F2 + P1 \times S1)/(S2 - S1) \quad \text{formula 2}$$

is obtained.

P1: The pressure (gauge pressure) of the first valve chamber 121

P2: The pressure (gauge pressure) of the first pressure control chamber 122

F1: The spring force of the valve spring 200

F2: The spring force of the pressure adjustment spring 220

S1: The pressure receiving area of the valve 190

S2: The pressure receiving area of the pressure plate 210

Here, regarding the spring force F1 of the valve spring 200 and the spring force F2 of the pressure adjustment spring 220, the direction of pressing the valve 190 and the pressure plate 210 is defined as positive (the left direction in FIG. 15B). In addition, regarding the pressure P1 of the first valve chamber 121 and the pressure P2 of the first pressure control chamber 122, P1 is configured to satisfy a relation of P1>P2.

The pressure P2 of the first pressure control chamber 122 when the communication port 191 is brought into the open state is determined by the formula 2. When the communication port 191 is brought into the open state, the ink flows from the first valve chamber 121 into the first pressure control chamber 122 because of the relation of P1>P2. As a result, the pressure P2 of the first pressure control chamber 122 does not decrease anymore, so that P2 is maintained at a pressure within a certain range.

On the other hand, a relation of forces acting on the pressure plate 210 when the pressure plate 210 is brought out of contact with the valve shaft 190*a*, so that the communication port 191 is brought into the closed state as shown in FIG. 15C is represented by the formula 3.

$$P3 \times S3 + F3 = 0 \quad \text{formula 3}$$

Here, if the formula 3 is rearranged in terms of P3, $$P3 = -F3/S3 \quad \text{formula 4}$$

is obtained.

F3: The spring force of the pressure adjustment spring 220 in the case where the pressure plate 210 and the valve shaft 190*a* are not in contact P3: The pressure (gauge pressure) of the first pressure control chamber 122 in the case where the pressure plate 210 and the valve shaft 190*a* are not in contact S3: The pressure receiving area of the pressure plate 210 in the case where the pressure plate 210 and the valve 190 are not in contact Here, FIG. 15C shows a state where the pressure plate 210 and the flexible member 230 have been moved in the left direction in the figure up to the limit of displacement. The pressure P3 of the first pressure control chamber 122, the spring force F3 of the pressure adjustment spring 220, and the pressure receiving area S3 of the pressure plate 210 change in accordance with the amount of displacement while the pressure plate 210 and the flexible member 230 are being displaced to the state of FIG. 15C. Specifically, in the case where the pressure plate 210 and the flexible member 230 are located at positions on the right side in FIG. 15 from the positions of FIG. 15C, the pressure receiving area S3 of the pressure plate 210 decreases, and the spring force F3 of the pressure adjustment spring 220 increases. As a result, the pressure P3 of the first pressure control chamber 122 decreases in accordance with the relation of the formula 4. Hence, the pressure of the first pressure control chamber 122 gradually increases (that is, the negative pressure decreases to a value approaching the positive pressure side) during transition from the state of FIG. 15B to the state of FIG. 15C in accordance with the formula 2 and the formula 4. That is, the pressure of the first pressure control chamber 122 gradually increases while the pressure plate 210 and the flexible member 230 are being gradually displaced in the left direction from the state where the communication port 191 is in the open state, and the inner volume of the first pressure control chamber 122 eventually reaches the limit of displacement. In other words, the negative pressure is decreasing.

Next, the flow of the ink in the entire liquid ejection head used in the above-described embodiments will be described with reference to FIGS. 16A to 16E.

<Flow of the Ink in the Entire Liquid Ejection Head>

Figure 16A:
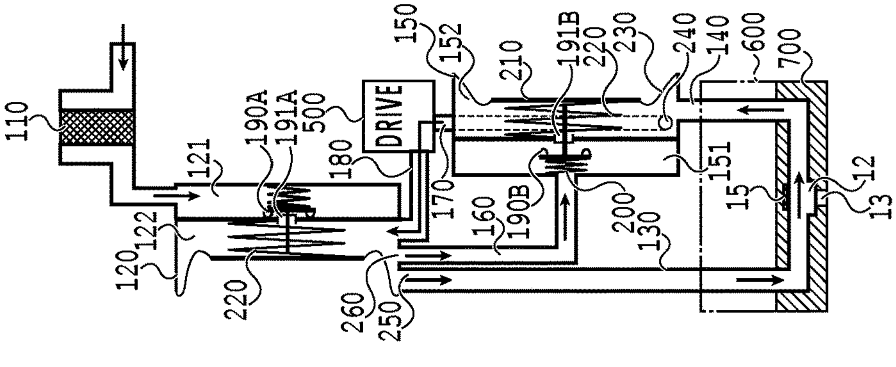
FIGS. 16A to 16E are diagrams for explaining the flow of an ink in the liquid ejection head.

FIGS. 16A to 16E are diagrams for explaining the flow of the ink in the liquid ejection head. The circulation of the ink taking place in the liquid ejection head 1 will be described with reference to FIGS. 16A to 16E. In order to more clearly describe the ink circulation path, the relative position of each configuration (the first pressure adjustment unit 120, the second pressure adjustment unit 150, the circulation pump 500, and the like) in FIGS. 16A to 16E is simplified. FIG. 16A schematically shows the flow of the ink while the printing operation to eject the ink from the ejection port 13 to perform printing is being performed. The arrows indicate the flow of the ink. In the present embodiment, to perform the printing operation, both of the external pump 21 and the circulation pump 500 start to be driven. Note that the external pump 21 and the circulation pump 500 may be driven irrespective of the printing operation. In addition, the external pump 21 and the circulation pump 500 do not have to be driven in coordination, but may be separately and independently driven.

During the printing operation, the circulation pump 500 is in the ON state (drive state), and the ink which has flowed out of the first pressure control chamber 122 flows into the supply channel 130 and the bypass channel 160. The ink which has flowed into the supply channel 130 passes through the channel member 600, then flows into the collection channel 140, and thereafter is supplied to the second pressure control chamber 152.

On the other hand, the ink which has flowed from the first pressure control chamber 122 into the bypass channel 160 flows through the second valve chamber 151, into the second pressure control chamber 152. The ink which has flowed into the second pressure control chamber 152 passes through the pump inlet channel 170, the circulation pump 500, and the pump outlet channel 180, and then again flows into the first pressure control chamber 122. At this time, the control pressure by the first valve chamber 121 is set to be higher than the control pressure of the first pressure control chamber 122 base on the relation of the aforementioned formula 2. Hence, the ink in the first pressure control chamber 122 does not flow into the first valve chamber 121 but again is supplied to the channel member 600 through the supply channel 130. The ink which has flowed into the channel member 600 again flows into the first pressure control chamber 122 through the collection channel 140, the second pressure control chamber 152, the pump inlet channel 170, the circulation pump 500, and the pump outlet channel 180. In this way, the ink circulation which is completed in the liquid ejection head 1 is performed.

In the above ink circulation, the circulation amount of the ink (flow rate) in the channel member 600 is determined depending on the differential pressure between the control pressures of the first pressure control chamber 122 and the second pressure control chamber 152. Then, this differential pressure is set such that the circulation amount enables the thickening of the ink near the ejection ports in the channel member 600 to be suppressed. In addition, the ink for the amount consumed by the printing is supplied from the ink tank 2 to the first pressure control chamber 122 through the filter 110 and the first valve chamber 121.

Here, the mechanism for supplying the ink for the consumption will be described in detail. The ink decreases from the circulation path for the ink consumed by the printing to reduce the pressure in the first pressure control chamber 122, and as a result, the ink in the first pressure control chamber 122 decreases as well. The inner volume of the first pressure control chamber 122 decreases in association with the decrease of the ink in the first pressure control chamber 122. This decrease of the inner volume of the first pressure control chamber 122 brings the communication port 191A into the open state, so that the ink is supplied from the first valve chamber 121 to the first pressure control chamber 122. In this ink supplied to the first pressure control chamber 122, pressure drop is generated while the ink is passing from the first valve chamber 121 through the communication port 191A. As the ink having a positive pressure flows into the first pressure control chamber 122, the ink switches to the negative pressure state. Then, the flow of the ink into the first pressure control chamber 122 from the first valve chamber 121 increases the pressure in the first pressure control chamber to increase the inner volume of the first pressure control chamber, so that the communication port 191A is brought into the closed state. In this way, the communication port 191A repeats the open state and the closed state in accordance with the consumption of the ink. In addition, in a case where the ink is not consumed, the communication port 191A is maintained in the closed state.

Figure 16B:
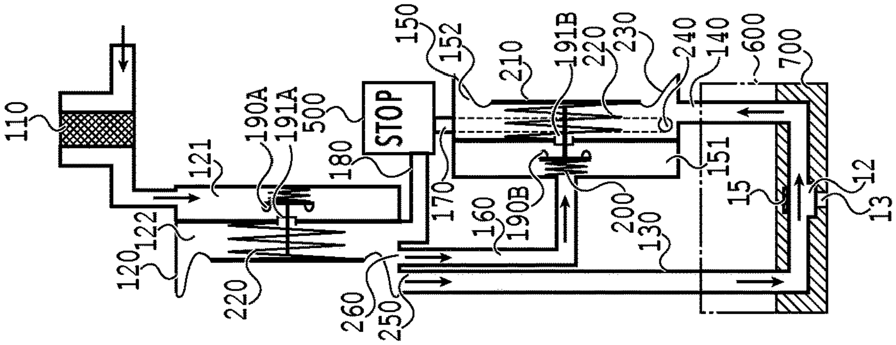

FIG. 16B schematically shows the flow of the ink immediately after the printing operation is completed and the circulation pump 500 is turned into the OFF state (stop state). At the time when the printing operation is completed and the circulation pump 500 is turned OFF, both the pressure of the first pressure control chamber 122 and the pressure of the second pressure control chamber 152 are control pressures during the printing operation. For this reason, the ink moves as shown in FIG. 16B in accordance with the differential pressure between the pressure of the first pressure control chamber 122 and the pressure of the second pressure control chamber 152. Specifically, the flow of the ink which is supplied from the first pressure control chamber 122 to the channel member 600 through the supply channel 130 and then flows into the second pressure control chamber 152 through the collection channel 140, continuously occurs. In addition, the flow of the ink from the first pressure control chamber 122 to the second pressure control chamber 152 through the bypass channel 160 and the second valve chamber 151 also continuously occurs.

The ink of the amount moved from the first pressure control chamber 122 to the second pressure control chamber 152 as a result of these flows of the ink is supplied from the ink tank 2 to the first pressure control chamber 122 through the filter 110 and the first valve chamber 121. For this reason, the inner volume in the first pressure control chamber 122 is maintained constant. From the relation of the aforementioned formula 2, when the inner volume in the first pressure control chamber 122 is constant, the spring force F1 of the valve spring 200, the spring force F2 of the pressure adjustment spring 220, the pressure receiving area S1 of the valve 190, and the pressure receiving area S2 of the pressure plate 210 are maintained constant. For this reason, the pressure of the first pressure control chamber 122 is determined in accordance with a change in the pressure (gauge pressure) P1 of the first valve chamber 121. Hence, in a case where there is no change in the pressure P1 of the first valve chamber 121, the pressure P2 of the first pressure control chamber 122 is maintained to the same pressure as the control pressure during the printing operation.

Figure 16C:
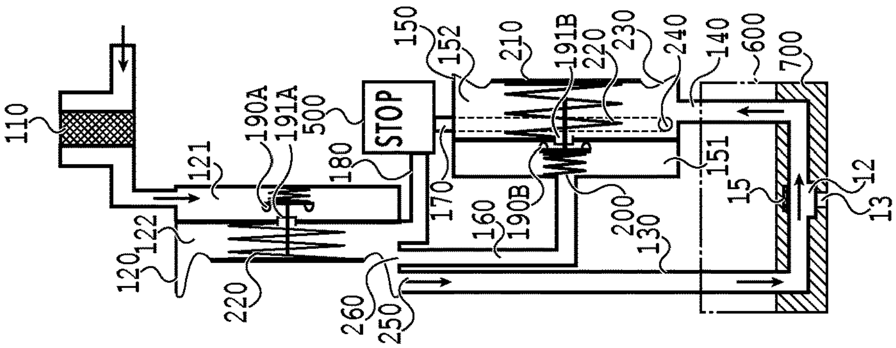
Figure 16D:
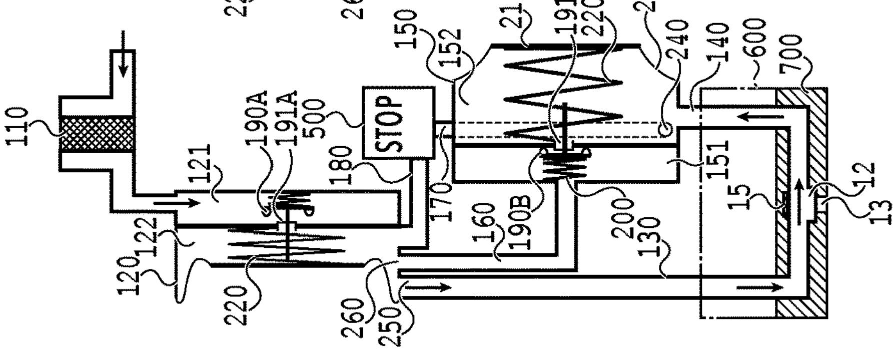

On the other hand, the pressure of the second pressure control chamber 152 changes with time in accordance with a change in the inner volume associated with the flow-in of the ink from the first pressure control chamber 122. Specifically, during a period from the state of FIG. 16B to a state where the communication port 191 is brought into the closed state, so that the second valve chamber 151 and the second pressure control chamber 152 stop communicating with each other as shown in FIG. 16C, the pressure of the second pressure control chamber 152 changes in accordance with the formula 2. Thereafter, the pressure plate 210 and the valve shaft 190*a* are brought out of contact with each other, so that the communication port 191 is brought in the closed state. Then, as shown in FIG. 16D, the ink flows from the collection channel 140 into the second pressure control chamber 152. This flow-in of the ink displaces the pressure plate 210 and the flexible member 230, and the pressure of the second pressure control chamber 152 changes, that is, increases in accordance with the formula 4 until the inner volume of the second pressure control chamber 152 reaches the maximum.

Note that once in the state of FIG. 16C, the flow of the ink from the first pressure control chamber 122 to the second pressure control chamber 152 through the bypass channel 160 and the second valve chamber 151 does not occur. Hence, after the ink in the first pressure control chamber 122 is supplied to the channel member 600 through the supply channel 130, only the flow into the second pressure control chamber 152 through the collection channel 140 occurs. As described above, the movement of the ink from the first pressure control chamber 122 to the second pressure control chamber 152 occurs in accordance with the differential pressure between the pressure in the first pressure control chamber 122 and the pressure in the second pressure control chamber 152. For this reason, once the pressure in the second pressure control chamber 152 becomes equal to the pressure in the first pressure control chamber 122, the movement of the ink stops.

Figure 16E:
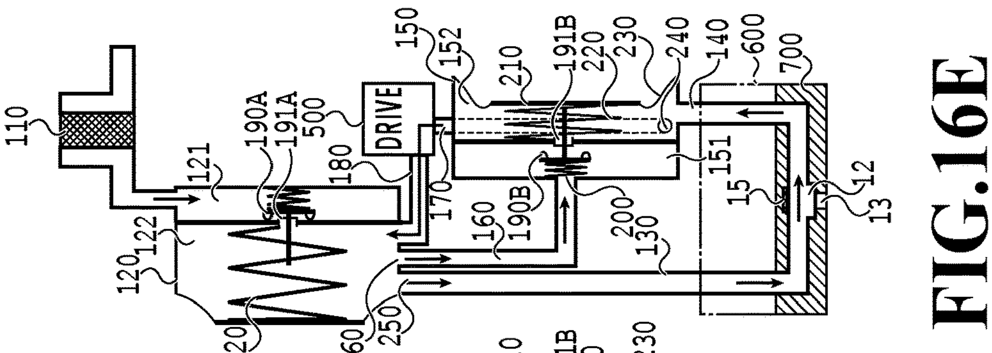

In addition, in a state where the pressure in the second pressure control chamber 152 becomes equal to the pressure in the first pressure control chamber 122, the second pressure control chamber 152 is expanded to the state shown in FIG. 16D. In the case where the second pressure control chamber 152 is expanded as shown in FIG. 16D, a reservoir capable of reserving the ink is formed in the second pressure control chamber 152. Note that transition from the stop of the circulation pump 500 to the state in FIG. 16D takes approximately 1 to 2 minutes although it can change depending on the shape and size of the channels as well as the properties of the ink. Once the circulation pump 500 is driven from the state shown in FIG. 16D where the ink is reserved in the reservoir, the ink in the reservoir is supplied to the first pressure control chamber 122 by the circulation pump 500. This increases the amount of the ink in the first pressure control chamber 122 and displaces the flexible member 230 and the pressure plate 210 in the expanding direction as shown in FIG. 16E. Then, continuously driving the circulation pump 500 changes the state in the circulation path as shown in FIG. 16A.

Note that in the above description, although FIG. 16A is described as the example at the time of printing operation, the ink may be circulated without the printing operation as described above. In this case as well, the flow of the ink as shown in FIGS. 16A to 16E occurs in accordance with the drive and stop of the circulation pump 500.

In addition, as described above, the present embodiment uses the example in which the communication port 191B in the second pressure adjustment unit 150 is brought into the open state in the case of circulating the ink by driving the circulation pump 500, and is brought into the closed state upon the stop of the circulation of the ink, the present disclosure is not limited to this. The control pressure may be set such that the communication port 191B in the second pressure adjustment unit 150 is maintained in the closed state even in the case where the ink is being circulated by driving the circulation pump 500. This will be described in detail below together with the role of the bypass channel 160.

The bypass channel 160 which connects the first pressure adjustment unit 120 and the second pressure adjustment unit 150 is provided, for example, to prevent, in a case where the negative pressure generated in the circulation path becomes higher than a predetermined value, such an increase from affecting the channel member 600. In addition, the bypass channel 160 is also provided to supply the ink from both the supply channel 130 side and the collection channel 140 side to the pressure chamber 12.

First, an example in which in a case where the negative pressure becomes higher than the predetermined value, the provision of the bypass channel 160 prevents the increase from affecting the channel member 600 will be described. For example, the properties (for example, viscosity) of the ink change due to a change in the environmental temperature in some cases. A change in the viscosity of the ink also changes the pressure drop in the circulation path. For example, a decrease in the viscosity of the ink decreases the pressure drop in the circulation path. As a result, the flow rate of the circulation pump 500 being driven at a certain driving amount increases, so that the flow rate of the ink flowing in the channel member 600 increases. On the other hand, since the channel member 600 is maintained at a constant temperature by a temperature adjustment mechanism, which is not shown, the viscosity of the ink in the channel member 600 is maintained constant even if the environmental temperature changes. While the viscosity of the ink in the channel member 600 does not change, the flow rate of the ink flowing in the channel member 600 increases, which causes the negative pressure in the channel member 600 to increase due to the flow resistance. In the case where the negative pressure in the channel member 600 becomes higher than the predetermined value in this way, there is a possibility that the meniscus of the ejection port 13 is broken, and external air is drawn into the circulation path, hindering a normal ejection. In addition, even if the meniscus is not broken, there is a possibility that the negative pressure in the pressure chamber 12 becomes higher than the predetermined value and affects the ejection.

For this reason, in the present embodiment, the bypass channel 160 is formed in the circulation path. Since the bypass channel 160 is provided, in the case where the negative pressure becomes higher than the predetermined value, the ink flows also through the bypass channel 160, so that the pressure of the channel member 600 can be maintained constant. Hence, for example, the communication port 191B in the second pressure adjustment unit 150 may be configured with such a control pressure as to maintain the closed state even in a case where the circulation pump 500 is being driven. Then, the control pressure in the second pressure adjustment unit may be set such that the communication port 191 in the second pressure adjustment unit 150 is brought into the open state in the case where the negative pressure becomes higher than the predetermined value. In other words, the communication port 191B may be in the closed state in the case where the circulation pump 500 is being driven, as long as the meniscus is not broken by a change in flow rate of the pump due to a change in viscosity such as environmental change, or a predetermined negative pressure is maintained.

Next, an example in which the bypass channel 160 is provided for supplying the ink from both the supply channel 130 side and the collection channel 140 side to the pressure chamber 12 will be described. A variation in pressure in the circulation path can be caused also by ejection operation of the ejection element 15. This is because a force of drawing the ink into the pressure chamber is generated by the ejection operation.

Hereinafter, a point that in a case of continuing printing with high duty, the ink is supplied to the pressure chamber 12 from both the supply channel 130 side and the collection channel 140 side will be described. Note that although the definition of the duty may vary depending on various conditions, here, a state where one ink droplet of 4 pl is printed in 1200 dpi grid is considered as 100%. Printing with high duty is considered to mean, for example, that the printing is performed with the duty of 100%.

In a case where printing with high duty is continued, the amount of the ink flowing from the pressure chamber 12 into the second pressure control chamber 152 through the collection channel 140 is reduced. On the other hand, since the circulation pump 500 causes the ink to flow out in a constant amount, the balance between flow-in and flow-out in the second pressure control chamber 152 is lost to reduce the ink in the second pressure control chamber 152 and increase the negative pressure in the second pressure control chamber 152, so that the second pressure control chamber 152 decreases in size. Then, the increase in negative pressure in the second pressure control chamber 152 increases the amount of the ink flowing into the second pressure control chamber 152 through the bypass channel 160 to balance the flow-out and the flow-in, so that the second pressure control chamber 152 is stabilized. In this way, the negative pressure in the second pressure control chamber 152 is increased in accordance with the duty as a consequence. In addition, as described above, in the configuration in which the communication port 191B is in the closed state in the case where the circulation pump 500 is being driven, the communication port 191B is brought into the open state depending on the duty, allowing the ink to flow from the bypass channel 160 into the second pressure control chamber 152.

Then, in the case where the printing with high duty is further continued, the amount of the ink flowing from the pressure chamber 12 into the second pressure control chamber 152 through the collection channel 140 decreases, and instead the amount of the ink flowing from the communication port 191B into the second pressure control chamber 152 through the bypass channel 160 increases. In the case where this state further proceeds, the amount of the ink flowing from the pressure chamber 12 into the second pressure control chamber 152 through the collection channel 140 decreases to zero, so that all the ink flowing out into the circulation pump 500 flows therein from the communication port 191B. In the case where this state further proceeds, the ink then flows backward from the second pressure control chamber 152 into the pressure chamber 12 through the collection channel 140. In this state, the ink flowing out the second pressure control chamber 152 into the circulation pump 500 and the ink flowing out into the pressure chamber 12 flows from the communication port 191B into the second pressure control chamber 152 through the bypass channel 160. In this case, the ink in the supply channel 130 and the ink in the collection channel 140 flow into the pressure chamber 12 to be ejected.

Note that this backward flow of the ink which occurs in the case where the printing duty is high is a phenomenon that occurs because the bypass channel 160 is provided. In addition, although the example in which the communication port 191B in the second pressure adjustment unit is brought into the open state in accordance with the backward flow of the ink is described above, there is a case where the backward flow of the ink occurs in a state where the communication port 191B in the second pressure adjustment unit is in the open state. In addition, the above-described backward flow of the ink can be caused by the provision of the bypass channel 160 even in a configuration in which the second pressure adjustment unit is not provided.

Other Embodiments

In the above-described embodiments, the example in which one set of ejection port arrays for a plurality of types (a plurality of colors) is provided in each of the two ejection element substrates 701 and 702, and ejection port array groups provided in the respective ejection element substrates 701 and 702 are line-symmetrically arranged have been described, the present disclosure is not limited to this. For example, the present disclosure can be applied to a liquid ejection head in which two sets of two ejection port array groups in each of which ejection port arrays for a plurality of types are arranged along a main scanning direction on a single ejection element substrate are line-symmetrically arranged.

Moreover, the liquid ejection head is not limited to the configuration in which ejection port arrays configured to eject an ink of the same type are line-symmetrically arranged, that is, is not limited to a symmetric liquid ejection head. The present disclosure can be applied to a liquid ejection head that includes a plurality of ejection port arrays for the same type and supplies a liquid to the plurality of ejection port arrays of the same type via different channels. Hence, the present disclosure can be applied to a liquid ejection head in which ejection port arrays of the same type are arranged in each of three or more ejection element substrates.

In addition, in the above-described embodiments, the example in which a channel which connects a single circulation unit and two ejection port arrays configured to eject an ink of the same type are formed of a common channel and two individual channel has been shown, but the present disclosure is not limited to this. It is possible to connect a single circulation unit and two ejection port arrays by using only two individual channels without a common channel. That is, it is possible to employ a configuration in which each of two individual channels which communicate with two ejection port arrays is directly connected to a single circulation unit.

The present disclosure makes it possible to achieve liquid circulation to a plurality of ejection port arrays which eject a liquid of the same color with a liquid ejection head having a small-sized configuration.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-082209, filed May 19, 2022, which is hereby incorporated by reference wherein in its entirety.

What is claimed is:

1. A liquid ejection head comprising:

an ejection unit including an ejection port array in which ejection ports configured to eject a liquid are arrayed, and a communication channel communicating with the ejection port array;

a channel member including a channel configured to supply and collect the liquid to and from the communication channel; and a circulation unit configured to supply the liquid to the channel of the channel member and collect the liquid from the channel of the channel member, wherein the ejection unit further includes a plurality of ejection port arrays configured to eject a liquid of the same type, and a plurality of communication channels corresponding to the plurality of ejection port arrays, and wherein the channel member includes a plurality of individual channels respectively through which the plurality of communication channels communicate with one of the circulation unit as a single circulation unit.

2. The liquid ejection head according to claim 1, wherein, among the plurality of individual channels, an individual channel having a long channel length includes a portion having a larger sectional area than that of an individual channel having a short channel length.

3. The liquid ejection head according to claim 1, wherein the channel member further includes a common channel communicating with the single circulation unit, and wherein the plurality of individual channels respectively through which the plurality of communication channels communicate with the single circulation unit are connected to a predetermined connecting point in the common channel.

4. The liquid ejection head according to claim 3, wherein each of the plurality of individual channels includes a connection channel communicating with the common channel and extending in a direction orthogonal to a plane direction, and wherein, among the plurality of individual channels, an individual channel having a long channel length from the connection channel to the predetermined connecting point has a larger sectional area in the connection channel than that in a connection channel of an individual channel having a short channel length from the connection channel to the predetermined connecting point.

5. The liquid ejection head according to claim 3, wherein, among the plurality of individual channels, at least one individual channel includes a connection channel communicating with the common channel at the predetermined connecting point through a first plane channel extending in a plane direction, and wherein the at least one individual channel has a larger sectional area in the connection channel than that in a connection channel of an individual channel communicating with the common channel not through the first plane channel.

6. The liquid ejection head according to claim 3, wherein each of the plurality of individual channels includes a connection channel extending in a direction orthogonal to a plane direction, and a first plane channel extending from the connection channel to the predetermined connecting point in a plane direction, and wherein, among the plurality of individual channels, an individual channel, the first plane channel of which has a long channel length, has a larger sectional area in the first plane channel than that in a first plane channel of an individual channel, the first plane channel of which has a short channel length.

7. The liquid ejection head according to claim 3, wherein each of the plurality of individual channels includes a connection channel extending in a direction orthogonal to a plane direction, and a first plane channel extending from the connection channel to the predetermined connecting point in the plane direction, and wherein, among the plurality of individual channels, an individual channel, the first plane channel of which has a long channel length, has a larger sectional area in the connection channel than that in a connection channel of an individual channel, the first plane channel of which has a short channel length.

8. The liquid ejection head according to claim 7, wherein each of the plurality of individual channels includes a plurality of second plane channels communicating with the common channel through the connection channel and the first plane channel and extending in the plane direction, and wherein, among the plurality of individual channels, an individual channel having a long channel length from the second plane channel to the predetermined connecting point has a larger sectional area in the second plane channel than that in a second plane channel of an individual channel having a short channel length from the second plane channel to the predetermined connecting point.

9. The liquid ejection head according to claim 8, wherein the ejection unit, the channel member, and the circulation unit are mounted on a carriage configured to move along a main scanning direction, and wherein the second plane channels extend in a direction orthogonal to the main scanning direction.

10. The liquid ejection head according to claim 3, wherein each of the plurality of individual channels includes a connection channel extending in a direction orthogonal to a plane direction, and a first plane channel extending from the connection channel to the predetermined connecting point in a plane direction, and wherein the first plane channel included respectively in the plurality of individual channels have an equal channel length.

11. The liquid ejection head according to claim 3, wherein the common channel includes a supply-side common channel communicating with the single circulation unit, and a collection-side common channel communicating with the single circulation unit, and wherein each of the plurality of individual channels includes a supply-side individual channel configured to supply, to the communication channel, the liquid supplied from the supply-side common channel, and includes a collection-side individual channel configured to guide, to the collection-side common channel, the liquid flowing from the communication channel.

12. The liquid ejection head according to claim 11, wherein, among the supply-side individual channel and the collection-side individual channel, an individual channel having a long channel length has a larger sectional area than that of an individual channel having a short channel length.

13. The liquid ejection head according to claim 1, wherein a plurality of the ejection units, a plurality of the channel members, and a plurality of the circulation units are provided corresponding respectively to liquids of a plurality of types.

14. The liquid ejection head according to claim 13, wherein, among the plurality of individual channels provided corresponding respectively to the liquids of the plurality of types, an individual channel having a long channel length has a portion having a larger sectional area than that of an individual channel having a short channel length.

15. The liquid ejection head according to claim 13, wherein each of the channel members includes a common channel communicating with a single one of the circulation unit, and a plurality of individual channels connected to a connecting point with the common channel, and wherein each of the plurality of individual channels includes a connection channel extending in a direction orthogonal to a plane direction, and a first plane channel extending from the connection channel to the predetermined connecting point in the plane direction.

16. The liquid ejection head according to claim 15, wherein, among the plurality of individual channels provided corresponding respectively to the liquids of the plurality of types, an individual channel, the first plane channel of which has a long channel length, has a larger sectional area in the connection channel than that in a connection channel of an individual channel, the first plane channel of which has a short channel length.

17. The liquid ejection head according to claim 15, wherein, among the plurality of individual channels provided corresponding respectively to the liquids of the plurality of types, an individual channel, the first plane channel of which has a long channel length, has a larger sectional area in the first plane channel than that in a first plane channel of an individual channel, the first plane channel of which has a short channel length.

18. The liquid ejection head according to claim 1, wherein the ejection unit, the channel member, and the circulation unit are mounted on a carriage configured to move along a main scanning direction.

19. The liquid ejection head according to claim 18, wherein, among the plurality of individual channels communicating respectively with the plurality of communication channels, an individual channel having a long channel length has a section with a larger width in the main scanning direction than that of a section of an individual channel having a short channel length.

20. The liquid ejection head according to claim 1, wherein the ejection unit includes two ejection port array groups in each of which a plurality of ejection port arrays configured to eject liquids of a plurality of types are arranged along a main scanning direction, and wherein the ejection port arrays of one of the two ejection port array groups and the ejection port arrays of the other of the two ejection port array groups are arranged to be line-symmetrical based on a straight line orthogonal to the main scanning direction between the ejection port array groups.

21. The liquid ejection head according to claim 20, wherein the two ejection port array groups are arranged respectively in two ejection element substrates arranged along the main scanning direction.

22. A liquid ejection head comprising:

an ejection unit including a first ejection port array configured to eject a first liquid, a first communication channel communicating with the first ejection port array, a second ejection port array configured to eject the first liquid, and a second communication channel communicating with the second ejection port array;

a channel member including a channel configured to supply and collect the liquid to and from a communication channel; and a circulation unit configured to supply the liquid to the channel of the channel member and collect the liquid from the channel of the channel member, wherein, in the channel member, a plurality of individual channels configured to be capable of distributing, to the first communication channel and the second communication channel of the ejection unit, the liquid supplied from the circulation unit are provided.

23. A liquid ejection apparatus comprising:

a conveyance unit configured to convey a printing medium; and a liquid ejection head configured to move in a main scanning direction intersecting a conveyance direction in which the printing medium is conveyed by the conveyance unit, wherein the liquid ejection head includes:

an ejection unit including an ejection port array in which ejection ports configured to eject a liquid are arrayed, and a communication channel communicating with the ejection port array, a channel member including a channel configured to supply and collect the liquid to and from the communication channel, and a circulation unit configured to supply the liquid to the channel of the channel member and collect the liquid from the channel of the channel member, wherein the ejection unit further includes a plurality of ejection port arrays configured to eject a liquid of the same type, and a plurality of communication channels corresponding to the plurality of ejection port arrays, and wherein the channel member includes a plurality of individual channels respectively through which the plurality of communication channels communicate with one of the circulation unit as a single circulation unit.

24. A liquid ejection apparatus comprising:

a conveyance unit configured to convey a printing medium; and a liquid ejection head configured to move in a main scanning direction intersecting a conveyance direction in which the printing medium is conveyed by the conveyance unit, the liquid ejection head including:

an ejection unit including a first ejection port array configured to eject a first liquid, a first communication channel communicating with the first ejection port array, a second ejection port array configured to eject the first liquid, and a second communication channel communicating with the second ejection port array, a channel member including a channel configured to supply and collect the liquid to and from a communication channel, and a circulation unit configured to supply the liquid to the channel of the channel member and collect the liquid from the channel of the channel member, wherein, in the channel member, a plurality of individual channels configured to be capable of distributing, to the first communication channel and the second communication channel of the ejection unit, the liquid supplied from the circulation unit are provided.

* * * * *